(12) United States Patent
Maeshima

(10) Patent No.: US 11,214,916 B2
(45) Date of Patent: Jan. 4, 2022

(54) FABRIC FOLDING DEVICE CAPABLE OF PERFORMING MULTIPLE TYPES OF FOLDING MODES

(71) Applicant: TOTOFOLDER MANUFACTURING CO.,LTD., Saitama (JP)

(72) Inventor: Yusuke Maeshima, Saitama (JP)

(73) Assignee: TOTOFOLDER MANUFACTURING CO., LTD., Saitama (JP)

( * ) Notice: Subject to any disclaimer, the term of this patent is extended or adjusted under 35 U.S.C. 154(b) by 333 days.

(21) Appl. No.: 16/345,248

(22) PCT Filed: Oct. 27, 2016

(86) PCT No.: PCT/JP2016/081887
§ 371 (c)(1),
(2) Date: Apr. 26, 2019

(87) PCT Pub. No.: WO2018/078764
PCT Pub. Date: May 3, 2018

(65) Prior Publication Data
US 2019/0292718 A1    Sep. 26, 2019

(51) Int. Cl.
*D06F 89/02*    (2006.01)
*D06F 89/00*    (2006.01)
(Continued)

(52) U.S. Cl.
CPC ............ *D06F 89/00* (2013.01); *B65G 21/14* (2013.01); *B65H 45/12* (2013.01); *D06F 65/02* (2013.01)

(58) Field of Classification Search
None
See application file for complete search history.

(56) References Cited

U.S. PATENT DOCUMENTS 5,556,360 A *  9/1996  Kober ................... D06F 89/00
                                                       493/23
10,718,084 B2 *  7/2020  Kitagawa .............. D06F 89/02

FOREIGN PATENT DOCUMENTS

CN    201592921    9/2010
CN    102639782    8/2012
(Continued)

OTHER PUBLICATIONS

"Office Action of China Counterpart Application", dated Oct. 29, 2020, with English translation thereof, p. 1-p. 16.
(Continued)

*Primary Examiner* — Leslie A Nicholson, III
(74) *Attorney, Agent, or Firm* — JCIPRNET

(57) ABSTRACT

A fabric folding device that is capable of performing multiple types of folding modes and prevents an occurrence of a waste space when the device is installed is provided. The fabric folding device does not require a pair of right and left French-folding gauges. There is provided a fabric folding device including a first folding unit capable of folding a fabric, which has a longitudinal direction aligned with a transportation direction and a width direction intersecting the longitudinal direction, at a position half or one-third a length of the fabric in the longitudinal direction; and rotation means for being capable of rotating the fabric such that the transportation direction is changed from the longitudinal direction to the width direction, by which the fabric folded by the first folding unit is to be transported from a front side to a rear side, and to be folded once more.

6 Claims, 16 Drawing Sheets

(51) Int. Cl.
*B65G 21/14* (2006.01)
*B65H 45/12* (2006.01)
*D06F 65/02* (2006.01)

(56) References Cited

FOREIGN PATENT DOCUMENTS

| | | |
|---|---|---|
| CN | 103628293 | 3/2014 |
| CN | 105586762 | 5/2016 |
| EP | 0677610 | 10/1995 |
| JP | H06198100 | 7/1994 |
| JP | 2003220300 | 8/2003 |
| JP | 2008018100 | 1/2008 |
| JP | 2013226408 | 11/2013 |

OTHER PUBLICATIONS

"International Search Report (Form PCT/ISA/210) of PCT/JP2016/081887," dated Dec. 13, 2016, with English translation thereof, pp. 1-2.

"Office Action of China Counterpart Application", with English translation thereof, dated May 8, 2021, p. 1-p. 13.

* cited by examiner

FABRIC FOLDING DEVICE CAPABLE OF PERFORMING MULTIPLE TYPES OF FOLDING MODES

CROSS-REFERENCE TO RELATED APPLICATION

This application is a 371 application of the International PCT application serial no. PCT/JP2016/081887, filed on Oct. 27, 2016. The entirety of the abovementioned patent application is hereby incorporated by reference herein and made a part of this specification.

TECHNICAL FIELD

The present invention relates to a fabric folding device that is equipped with a conveyor including belt units and for sending a fabric in a forward and rearward direction, and is capable of selectively performing multiple types of folding modes such as a fabric sent being French-folded and a sent fabric not being French-folded.

BACKGROUND ART

Japanese Unexamined Patent Application Publication No. 2003-220300 discloses a fabric folding device that controls final finish dimensions by identifying types of fabrics of various types by detecting identification factors (for example, a fabric length between a front end and a rear end of a fabric being moved at a constant speed by a transportation device, and a fabric thickness) via identification means, and in response to identification results, by instructing multiple fabric folding units for folding a fabric to perform folding in a longitudinal direction T which is common to the mixed fabrics, and then to perform double-folding required for large fabrics and French-folding required for small fabrics.

The device includes a longitudinally folding unit that folds a fabric into several sections in the longitudinal direction T, and a laterally folding unit that folds the longitudinally folded fabric into several sections in a width direction H of the fabric. The longitudinally folding unit and the laterally folding unit are perpendicularly disposed. There is a problem that a waste space occurs at a so-called linen factory when the longitudinally folding unit and the laterally folding unit are perpendicularly disposed. Particularly, when it is required to cope with a replacement demand of a straight device, the factory may not have a space for coping with a layout of the device in which the longitudinally folding unit and the laterally folding unit are perpendicularly disposed, and it may not be possible to cope with the replacement demand.

Japanese Unexamined Patent Application Publication No. 2008-18100 discloses a fabric folding device that is equipped with a conveyor for sending a fabric in a forward and rearward direction and including multiple pairs of right and left belts, and is capable of selectively performing multiple types of folding modes such as the sent fabric being French-folded and the sent fabric not being French-folded. A French-folding gauge is disposed above an inside belt of the multiple pairs of right and left belts of the conveyor, has a slender shape extending in the forward and rearward direction, and has the function of specifying a folding position for French-folding. The French-folding gauge is vertically movably provided in a body of the device so as to take an action posture where the French-folding gauge comes into contact with the sent fabric to push the sent fabric onto the inside belt, and a retraction posture where the French-folding gauge allows the sent fabric to pass by without coming into contact with the sent fabric. An outside belt of the multiple pairs of right and left belts of the conveyor is provided such that a vertical position of the outside belt can be selected by a movable guide plate attached to the body of the device. The outside belt is provided such that the outside belt at a lower position is substantially flush with the inside belt, and when the outside belt is at an upper position, a vertical gap is formed between the inside and outside belts and French-folding can be performed. A French-folding knife for performing French-folding and having a slender shape extending in the forward and rearward direction is disposed under each of the right and left outside belts. A reciprocating mechanism is provided to move the French-folding knife from a location under the outside belt to a location above the inside belt when the vertical gap is formed between the inside and outside belts. The fabric is folded above the folding gauge in contact with the inside belt. The French-folding knife and the reciprocating mechanism are provided on a base plate, and the base plate is installed in such a manner that the base plate can be elevated relative to the body of the device by an elevating mechanism. When the French-folding is performed, the base plate moves upward before and after the outside belt moves upward, and the French-folding knife is disposed at a position of the vertical gap between the inside and outside belts.

Because the center of the fabric has to be aligned with the centers of a pair of right and left French-folding gauges, the device requires a mechanism for aligning the center of the fabric with the centers of the French-folding gauges, and the folding device becomes complicated, which is a problem.

CITATION LIST

Patent Literature

[PTL 1] Japanese Unexamined Patent Application, First Publication No. 2003-220300
[PTL 2] Japanese Unexamined Patent Application, First Publication No. 2008-18100

SUMMARY OF INVENTION

Technical Problem

The present invention has been made in light of the problems, and an object of the present invention is to provide a fabric folding device that prevents an occurrence of a waste space when the device is installed, and is capable of performing multiple types of folding modes. Another object is to provide the fabric folding device that does not require a pair of right and left French-folding gauges.

Solution to Problem

According to a first aspect, as a result of in-depth research and development to solve the problems, there is provided a fabric folding device including a first folding unit capable of folding a fabric, which has a longitudinal direction aligned with a transportation direction and a width direction intersecting the longitudinal direction, at a position half or one-third a length of the fabric in the longitudinal direction; and rotation means for being capable of rotating the fabric such that the transportation direction is changed from the longitudinal direction to the width direction, by which the fabric folded by the first folding unit is to be transported from a front side to a rear side, and to be folded once more.

According to the first aspect, the fabric folding device of a second aspect further includes a second folding unit capable of folding the fabric, which is rotated by the rotation means, once more at a position half or one-third a length of the fabric in the width direction.

According to the first or second aspect, in the fabric folding device of a third aspect, the first folding unit has a first conveyor that transports the fabric from the front side to the rear side, a first forward and reverse conveyor that further transports the fabric, which is transported from the first conveyor, from the front side to the rear side, and rotates reversely at a predetermined time, a first folding portion disposed to fold the transported fabric between the first conveyor and the first forward and reverse conveyor, a second conveyor that transports the fabric, which is transported by the first forward and reverse conveyor, from the rear side to the front side, a second forward and reverse conveyor that transports the fabric, which is transported from the second conveyor, from the rear side to the front side, and rotates reversely at a predetermined time, and a second folding portion disposed to fold the transported fabric between the second conveyor and the second forward and reverse conveyor once more.

According to the second or third aspect, in the fabric folding device of a fourth aspect, the second folding unit has a third conveyor that transports the fabric, which is rotated by the rotation means, from the front side to the rear side, a third forward and reverse conveyor that further transports the fabric, which is transported from the third conveyor, from the front side to the rear side, and rotates reversely at a predetermined time, a third folding portion disposed to fold the transported fabric between the third conveyor and the third forward and reverse conveyor, a fourth conveyor that transports the fabric, which is transported by the third forward and reverse conveyor, from the rear side to the front side, a fourth forward and reverse conveyor that transports the fabric, which is transported from the fourth conveyor, from the rear side to the front side, and rotates reversely at a predetermined time, and a fourth folding portion disposed to fold the transported fabric between the fourth conveyor and the fourth forward and reverse conveyor once more.

According to the third or fourth aspect, in the fabric folding device of a fifth aspect, a first folding bridge claw is further disposed to bridge a gap between the first conveyor and the first forward and reverse conveyor.

According to the first to fifth aspects, in the fabric folding device of a sixth aspect, a second folding bridge claw is further disposed to bridge a gap between the second conveyor and the second forward and reverse conveyor.

Advantageous Effects of Invention

The present invention has the configuration and the effects, and thus it is possible to provide the fabric folding device not requiring a pair of right and left French-folding gauges. Because the device has a straight layout from the front side to the rear side, it is possible to provide the fabric folding device preventing an occurrence of a waste space at a linen factory where the device is disposed.

BRIEF DESCRIPTION OF DRAWINGS

A of FIG. 1 is a plan view of a fabric folding device. B of FIG. 1 is a conceptual side view of the fabric folding device.

Figure 8:
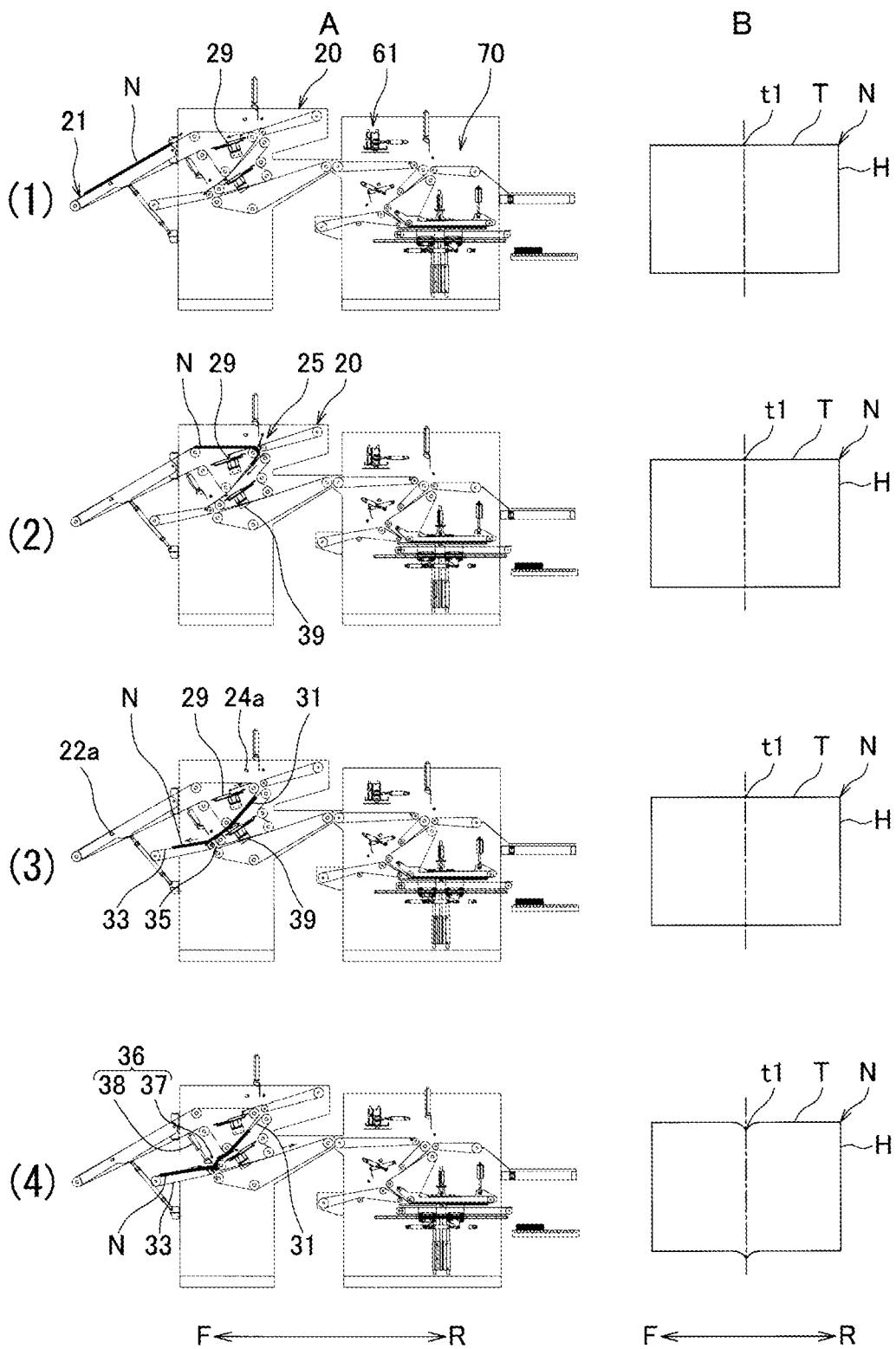

(1) of FIG. 8 is a view illustrating a state where a fabric is transported. (2) of FIG. 8 is a view illustrating a state where the fabric passes over a gap. (3) of FIG. 8 is a view illustrating a state where the fabric is to double-folded. (4) of FIG. 8 is a view illustrating a state where the fabric is double-folded.

Figure 9:
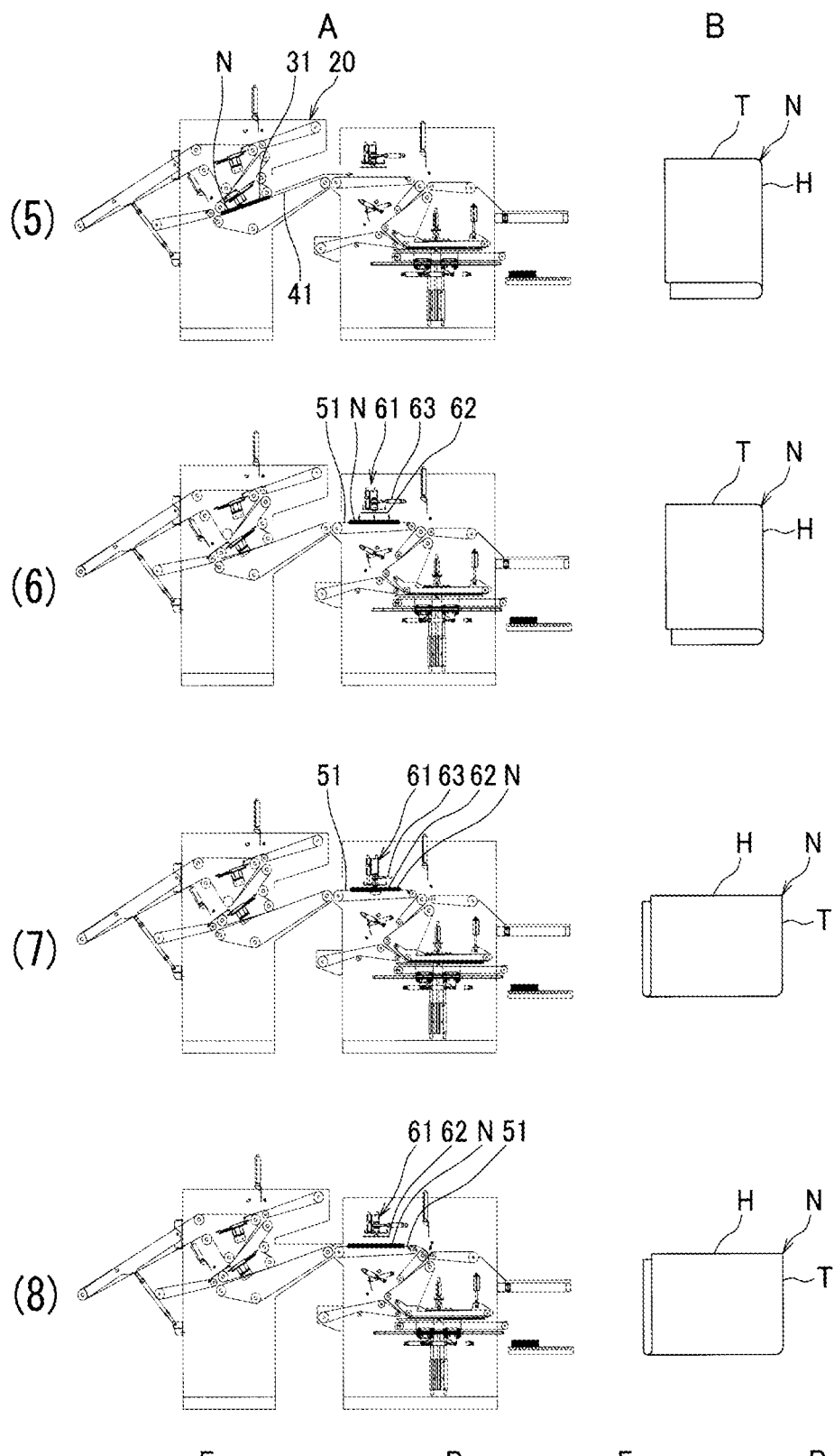

(5) of FIG. 9 is a view illustrating a state where the fabric is further transported. (6) of FIG. 9 is a view illustrating a state where the fabric is transported to a location directly under the rotating means. (7) of FIG. 9 is a view illustrating a state where the fabric is to be rotated. (8) of FIG. 9 is a view illustrating a state where the fabric is rotated.

Figure 10:
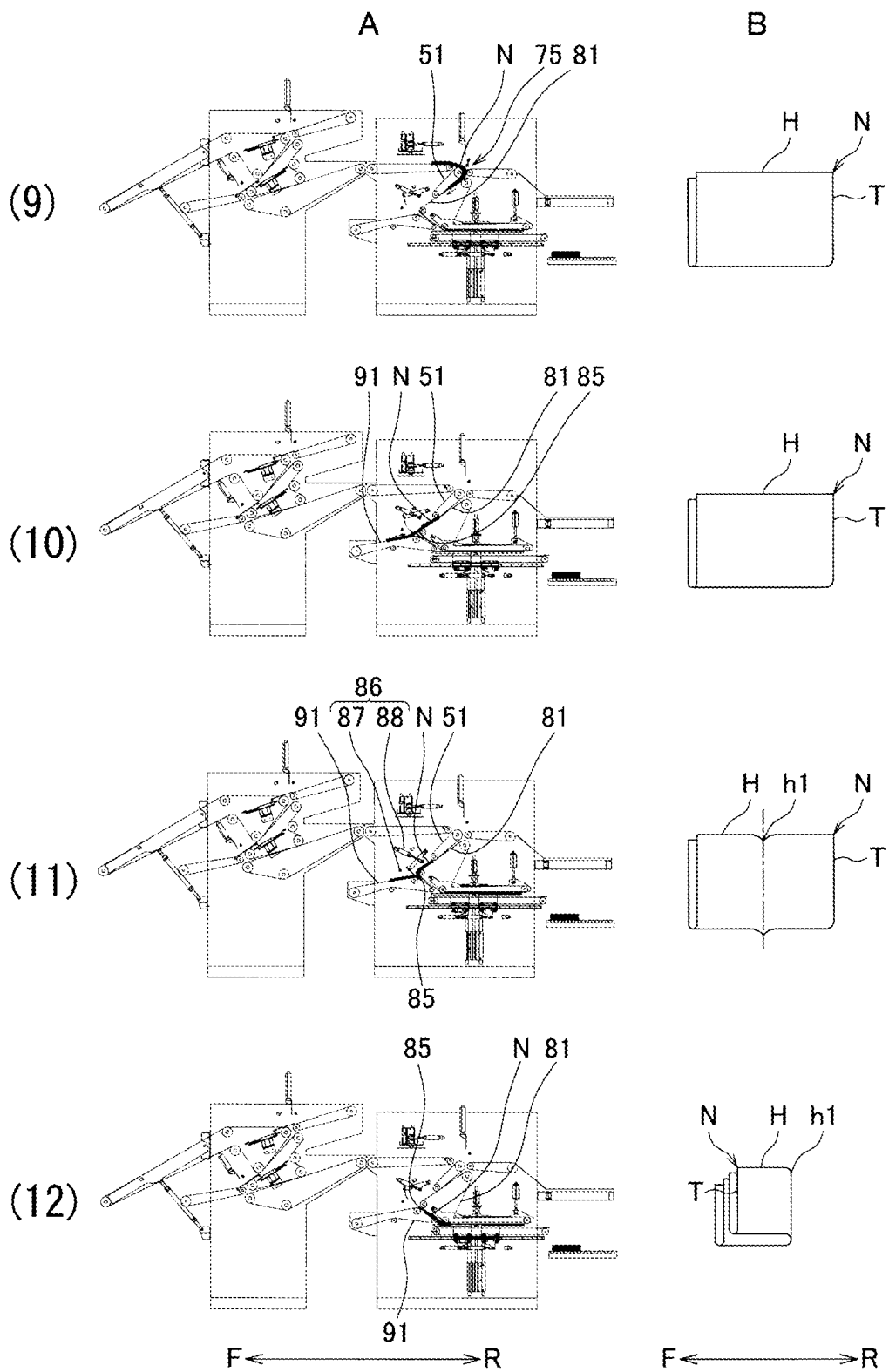

(9) of FIG. 10 is a view illustrating a state where the rotated fabric passes over a third gap. (10) of FIG. 10 is a view illustrating a state where the fabric passes over a fourth gap. (11) of FIG. 10 is a view illustrating a state where the fabric is to double-folded once more. (12) of FIG. 10 is a view illustrating a state where the fabric is double-folded and transported.

Figure 11:
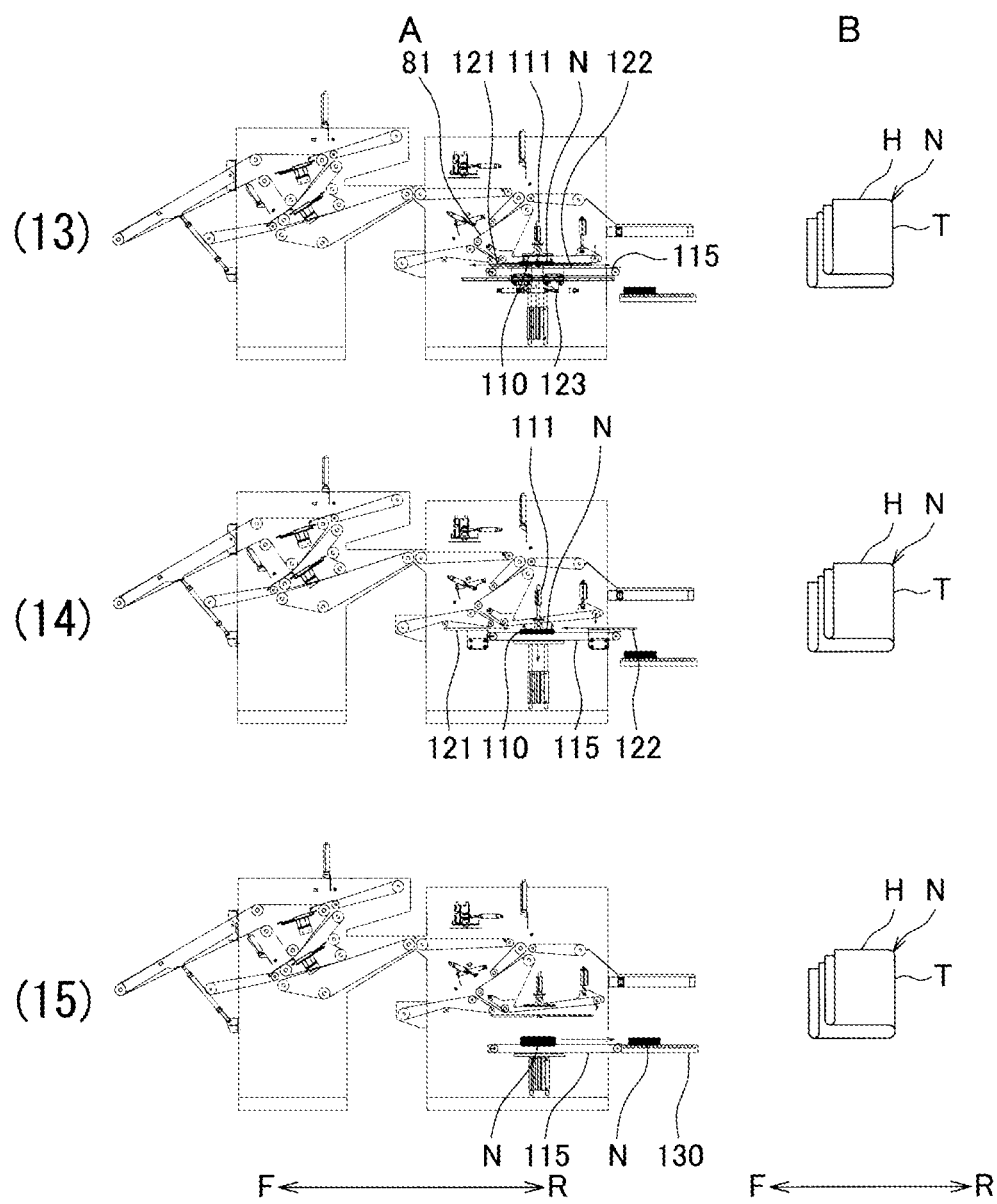

(13) of FIG. 11 is a view illustrating a state where the transported fabric is disposed over a first opening/closing door and a second opening/closing door. (14) of FIG. 11 is a view illustrating a state where the first opening/closing door and the second opening/closing door are open. (15) of FIG. 11 is a view illustrating a state where the fabric is transported to a roller conveyor.

Figure 12:
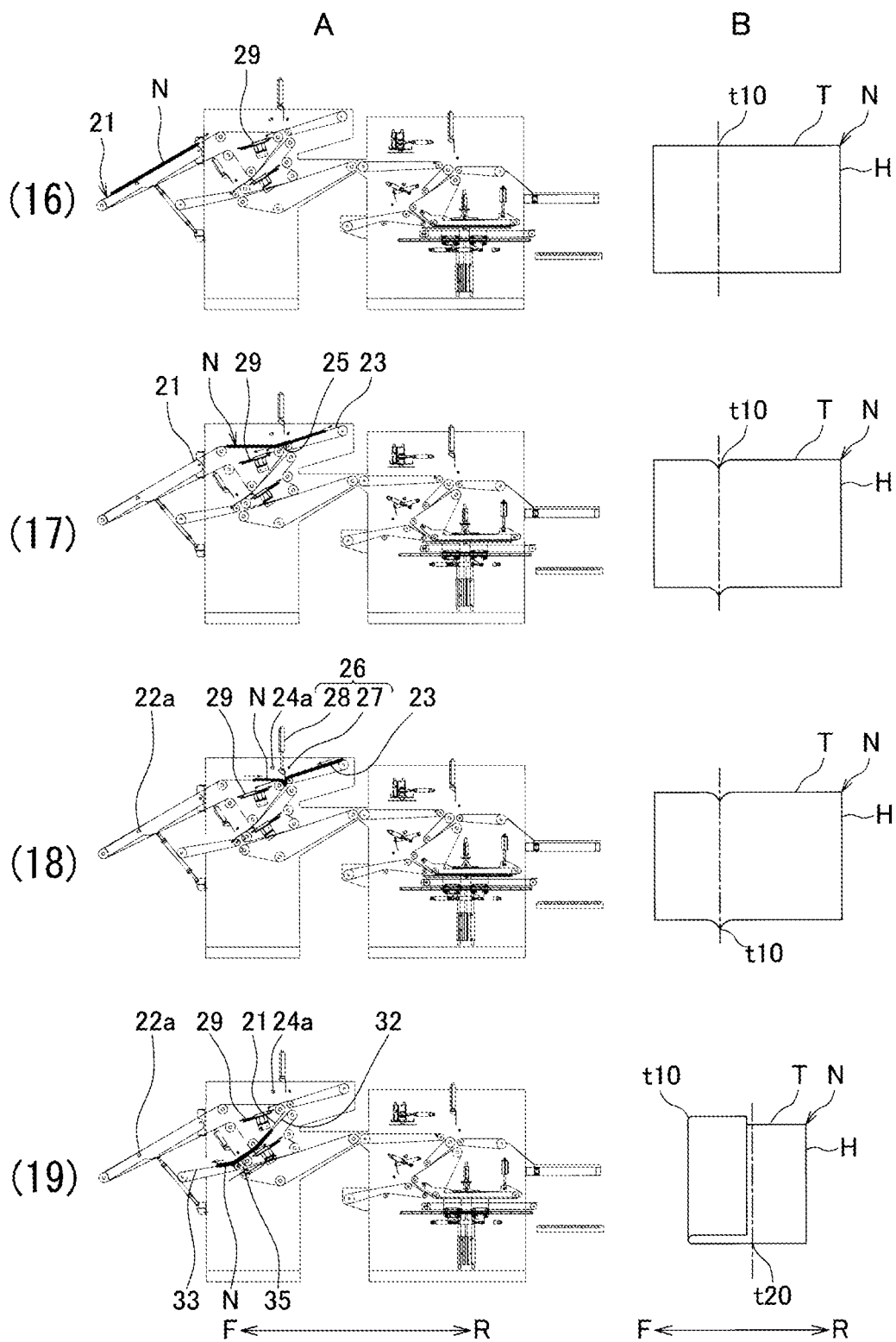

(16) of FIG. 12 is a view illustrating a state where the fabric is transported. (17) of FIG. 12 is a view illustrating a state where the fabric passes over the gap. (18) of FIG. 12 is a view illustrating a state where the fabric is to double-folded. (19) of FIG. 12 is a view illustrating a state where the fabric is double-folded.

Figure 13:
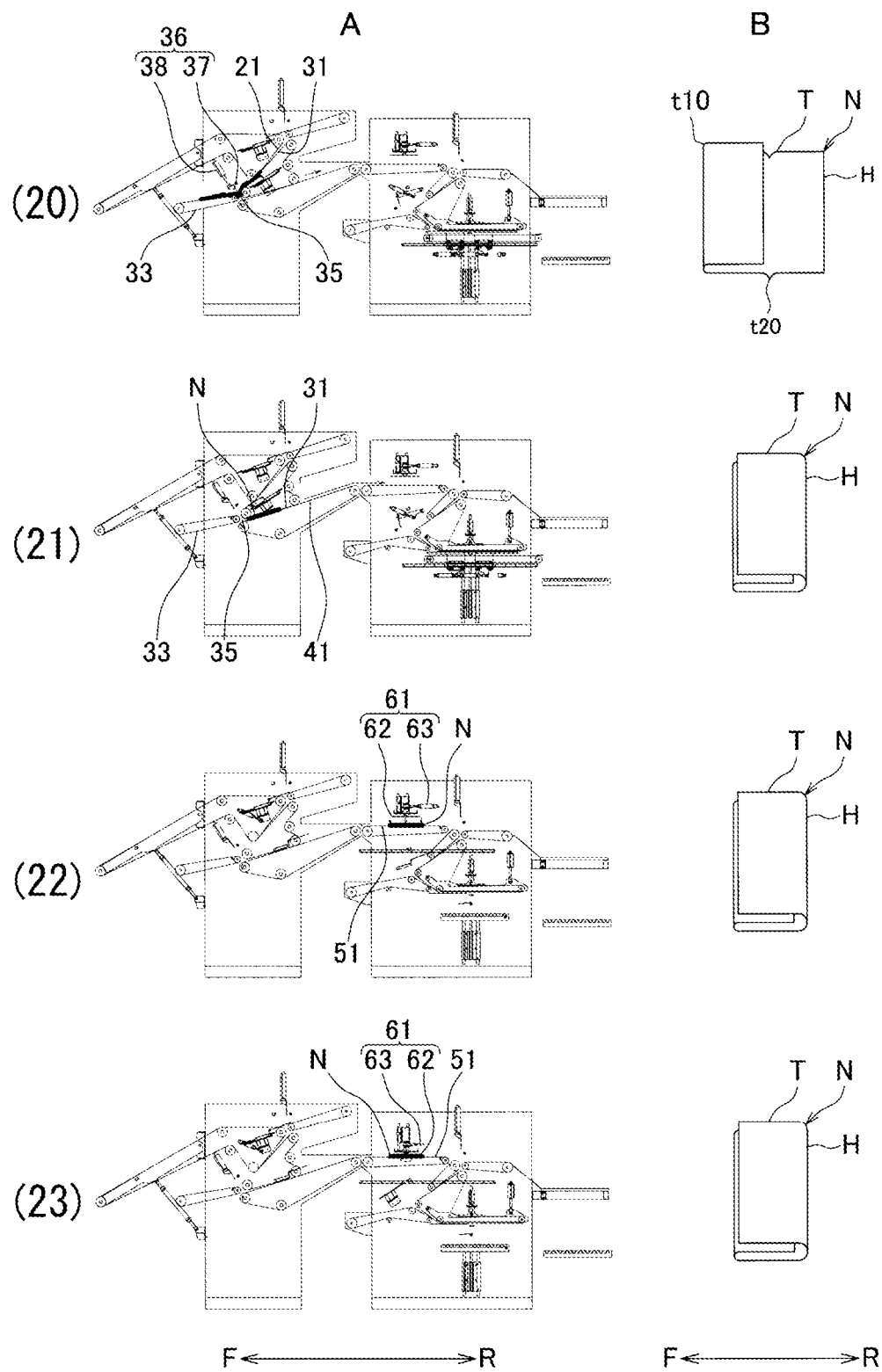

(20) of FIG. 13 is a view illustrating a state where the fabric is double-folded once more. (21) of FIG. 13 is a view illustrating a state where the fabric is transported. (22) of FIG. 13 is a view illustrating a state where the fabric is transported to a location directly under the rotation means. (23) of FIG. 13 is a view illustrating a state where the fabric is to be rotated.

Figure 14:
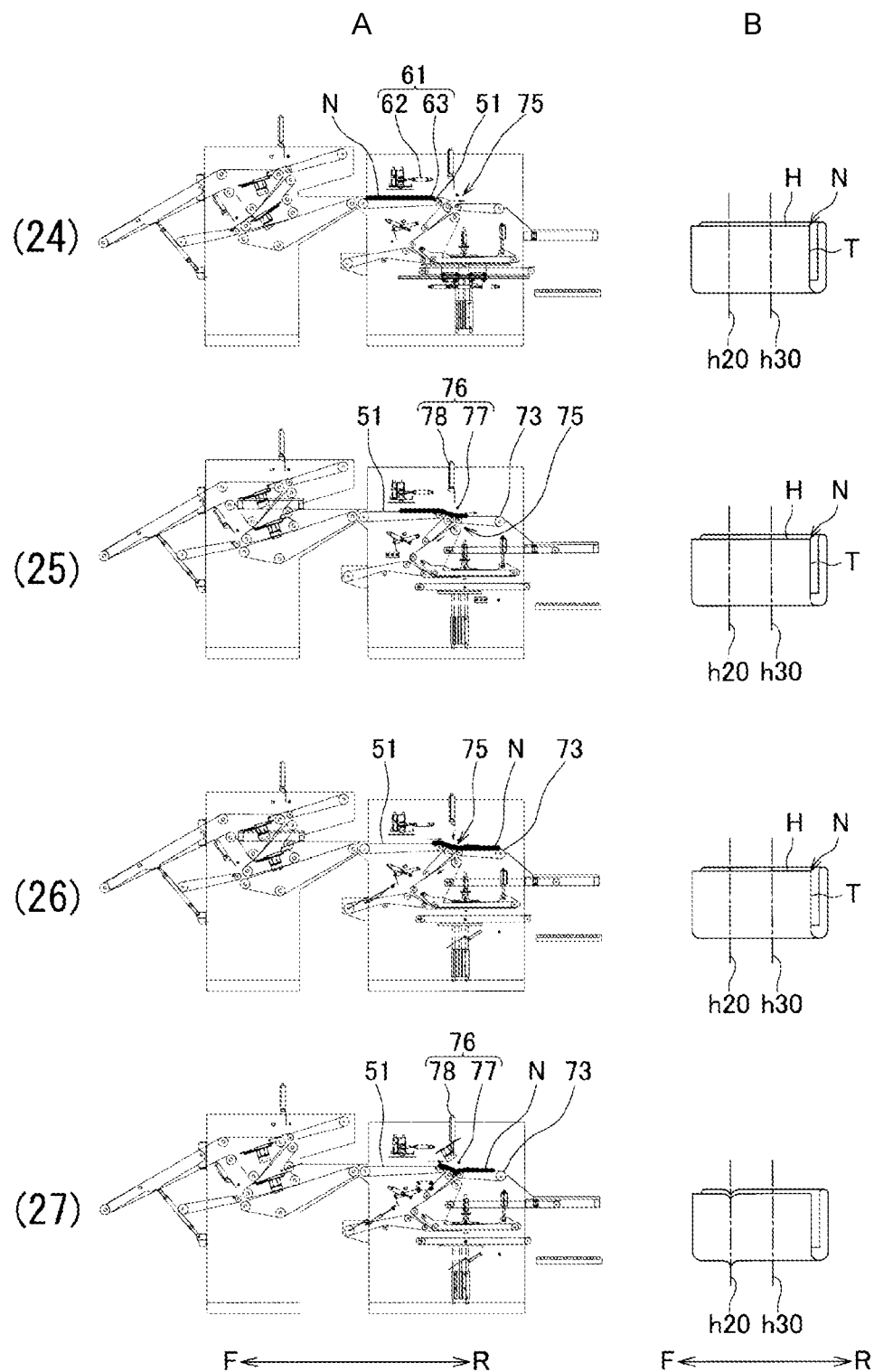

(24) of FIG. 14 is a view illustrating a state where the fabric is rotated. (25) of FIG. 14 is a view illustrating a state where the rotated fabric passes over the third gap. (26) of FIG. 14 is a view illustrating a state where the fabric is to be double-folded once more. (27) of FIG. 14 is a view illustrating a state where the fabric is double-folded once more.

Figure 15:
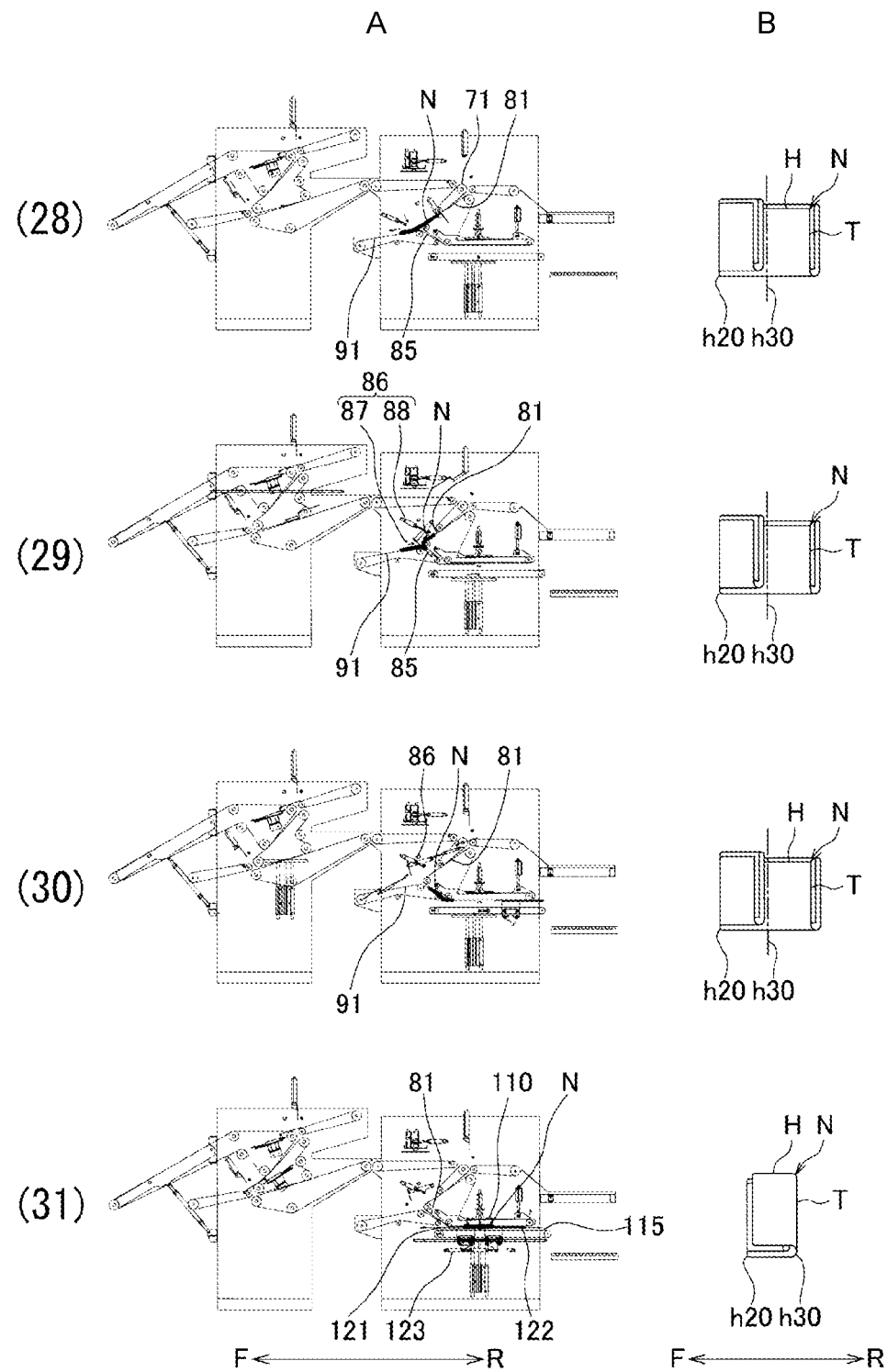

(28) of FIG. 15 is a view illustrating a state where the fabric passes over the fourth gap. (29) of FIG. 15 is a view illustrating a state where the fabric is to be double-folded once more. (30) of FIG. 15 is a view illustrating a state where the fabric is double-folded once more and transported. (31) of FIG. 15 is a view illustrating a state where the transported fabric is disposed over the first opening/closing door and the second opening/closing door.

Figure 16:
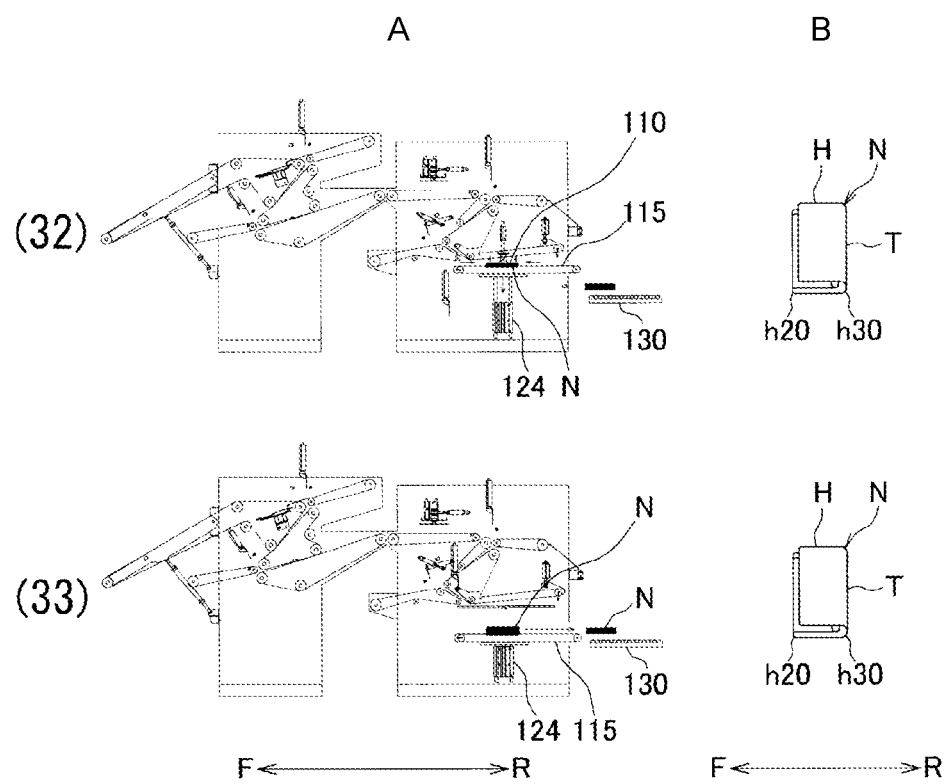

(32) of FIG. 16 is a view illustrating a state where the first opening/closing door and the second opening/closing door are open. (33) of FIG. 16 is a view illustrating a state where the fabric is transported to the roller conveyor.

DESCRIPTION OF EMBODIMENTS

Figure 1:
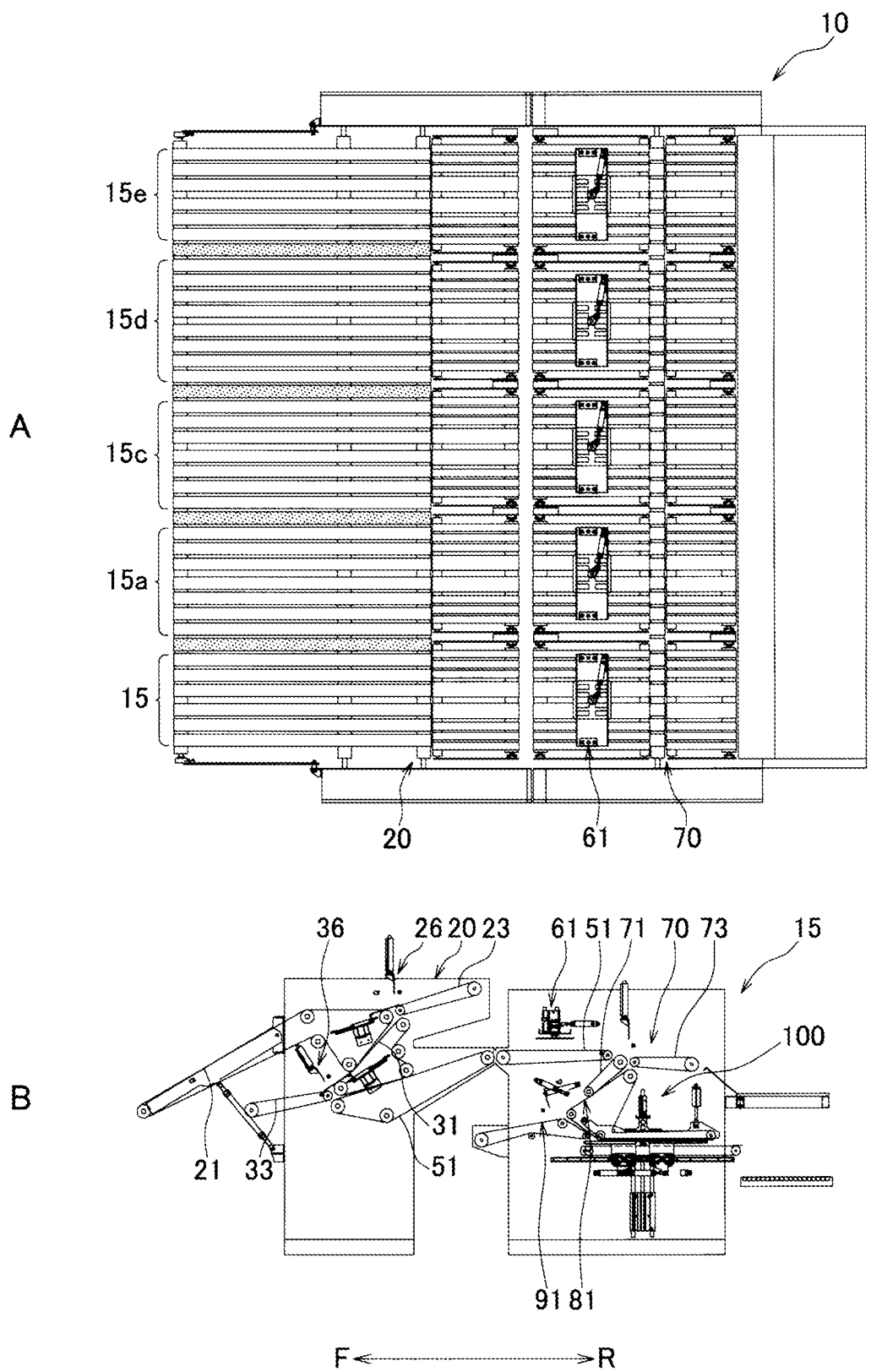

While transporting a laundered and dried fabric N from a front side F to a rear side R, a fabric folding device 10 of an embodiment folds the fabric N at a position half or one-third the length of the fabric N in a direction aligned with a transportation direction, that is, in a longitudinal direction T, and then rotates the fabric N via rotation means 61 such that the transportation direction is changed from the longitudinal direction T to a width direction H. Because the rotation means 61 rotates the fabric N such that the width direction H becomes the direction aligned with the transportation direction of the fabric N, while straightly transporting the fabric N from the front side F to the rear side R, the device is capable of folding the fabric N once more at a position half or one-third the length of the fabric N in the width direction H. The fabric folding device 10 is also capable of folding a relatively small fabric such as napkin in a similar manner in addition to fabrics such as sheet. FIG. 1 illustrates a plan view and a side view of the fabric folding device 10 of the embodiment.

The fabric folding device 10 has multiple conveyor devices 15, 15a, 15b, 15c, and 15d. The multiple conveyor devices 15, 15a, 15b, 15c, and 15d are disposed in a direction vertical to a direction heading from the front side F to the rear side R, which is a progress direction where the fabric N is transported in the fabric folding device 10. The multiple conveyor devices 15, 15a, 15b, 15c, and 15d are independently operable, and have a straight layout in spite of being capable of folding the fabric N multiple times. Therefore, the fabric folding device 10 equipped with the multiple conveyor devices 15, 15a, 15b, 15c, and 15d also has a straight layout. In the embodiment, it is possible to simultaneously fold five pieces of the fabrics N by disposing the conveyor devices 15, 15a, 15b, 15c, and 15d in the direction vertical to the direction heading from the front side F to the rear side R, that is, by disposing the conveyor devices 15, 15a, 15b, 15c, and 15d in parallel (refer to FIG. 1). It is possible to dispose a predetermined number of the conveyor devices 15, in the fabric folding device 10 depending on a space of disposition. The fabric N is not illustrated in FIG. 1.

If the conveyor devices 15, 15a, 15b, 15c, and 15d operate synchronously, which will be described later, each of multiple first folding units 20 (to be described later) is capable of a fabric one or two times, which is greater than a napkin such as sheet. Because the multiple conveyor devices 15, 15a, 15b, 15c, and 15d have the same configuration, the conveyor device 15 will be described, and descriptions of the other conveyor devices 15a, 15b, 15c, and 15d will be omitted.

The conveyor device 15 has the first folding unit 20; the rotation means 61; and a second folding unit 70. It is possible to dispose the first folding unit 20, the rotation means 61, and the second folding unit 70 in a row in the direction heading from the front side F to the rear side R, that is, substantially straightly. Because it is possible to install the fabric folding device 10 in a straight layout when installing the device at a so-called linen factory, waste spaces as those with devices in the related do not occur. Particularly, if it is required to cope with a device replacement demand, when other devices already disposed at the factory are replaced, it is possible to accommodate the fabric folding devices 10 in an original space where the other devices are disposed.

The first folding unit 20 includes a first conveyor 21; a first forward and reverse conveyor 23; a folding portion 26; a second conveyor 31; a second forward and reverse conveyor 33; a second folding portion 36; and a third conveyor 41. A first fold bridge claw 29 and a second fold bridge claw 39 are capable of being disposed in the first folding unit 20, which will be described later.

Figure 2:
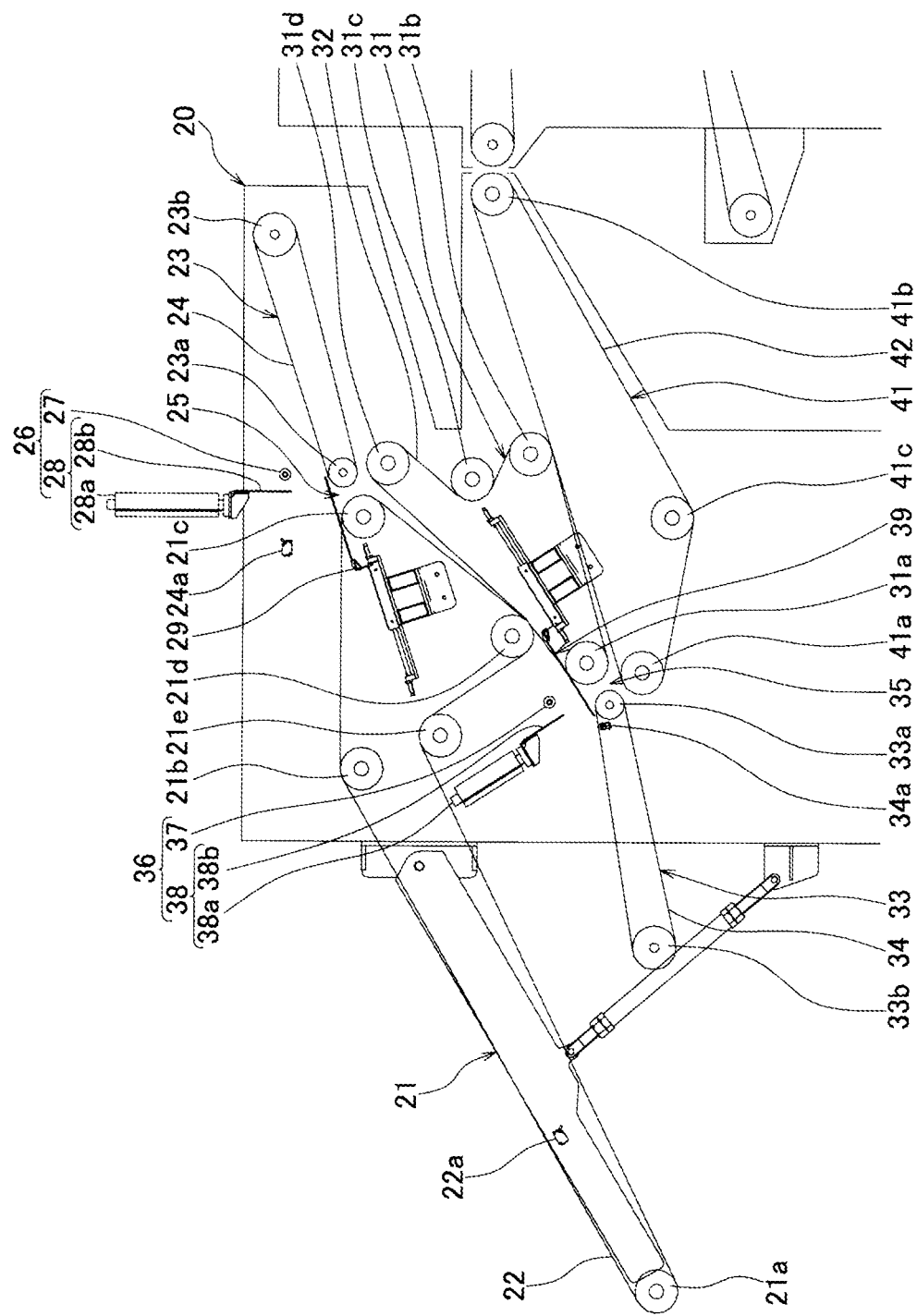
FIG. 2 is a conceptual side view of a first folding unit of the fabric folding device.

The first conveyor 21 is disposed from the front side F to the rear side R of the fabric folding device 10, and is capable of transporting the fabric N from the front side F to the rear side R A first a roller unit 21a, a first b roller unit 21b, a first c roller unit 21c, a first d roller unit 21d, and a first e roller unit 21e are disposed which rotate via power of a motor (not illustrated), and a belt unit 22 having a belt shape is disposed to sequentially travel around the first a roller unit 21a, the first b roller unit 21b, the first c roller unit 21c, the first d roller unit 21d, and the first e roller unit 21e. The belt unit 22 is flexible, and in the belt unit 22 of the embodiment made of multiple belt-shaped fabrics, seven pieces of belt-shaped fabrics are disposed in parallel, that is, in a direction vertical to the direction heading from the front side F to the rear side R (refer to FIGS. 1 and 2).

A well-known sensor 22a is equipped to measure a length of the fabric N from the front side F to the rear side R, that is, a length of the fabric N in a transportation direction or in the longitudinal direction T. Therefore, it is possible to measure a predetermined time for detecting a position half or one-third the length of the fabric N in a direction aligned with the transportation direction, and for folding the fabric N by detecting a transportation speed of the fabric N via measuring the time taken for the fabric N to pass by the length in the longitudinal direction T, or via measuring pulses (refer to FIG. 2).

The first forward and reverse conveyor 23 is capable of changing a rotational direction at the predetermined time from a forward rotation where the fabric N is transported from the front side F to the rear side R to a reverse rotation where the fabric N is transported from the rear side R to the front side F. Because the well-known sensor 22a is capable of the length of the fabric N in the transportation direction, that is, the length of the fabric N in the longitudinal direction T, and a well-known second sensor 24a is capable of detecting the position half or one-third the length of the fabric N in the longitudinal direction T, when a folding position of the fabric N is specified depending on multiple folding modes (to be described later), the rotational direction is changed from the forward rotation to the reverse rotation after a predetermined amount of time has elapsed. The transportation speed of the fabric N in the fabric folding device 10 may be changed to synchronize with a process speed of a roll ironer (not illustrated) that is disposed and dries the fabric N in a previous step of the fabric folding device 10 of the embodiment. It is not possible to obtain an accurate time only by measuring the pass-by time. In this case, it is possible to measure the transportation speed and the predetermined time by measuring pulses in such a way that the well-known sensor 22a and the well-known second sensor 24a turn on and a pulse measurement starts when the fabric N is transported to the position where the fabric N is detected by one or both of the sensors 22a and 24a, and the sensors 22a and 24a turn off when a side edge of the fabric N escapes from the sensors 22a and 24a.

In the first forward and reverse conveyor 23, a first a forward and reverse roller unit 23a and a first b forward and reverse roller unit 23b are disposed which rotate via power of a motor (not illustrated), and a first forward and reverse belt unit 24 having flexibility and a belt shape is disposed to travel around the first a forward and reverse roller unit 23a and the first b forward and reverse roller unit 23b. In the first forward and reverse belt unit 24 of the embodiment made of multiple belt-shaped fabrics, seven pieces of belt-shaped fabrics are disposed in parallel (refer to FIGS. 1 and 2).

The first conveyor 21 and the first forward and reverse conveyor 23 are disposed while being spaced apart from each other by a predetermined gap 25. That is, the predetermined gap 25 is disposed between the first c roller unit 21c and the first a forward and reverse roller unit 23a. Preferably, the gap 25 is a gap over which the folded fabric N is capable of smoothly passing. The folding portion 26 is disposed to push the transported fabric N into the gap 25, and to fold the transported fabric N. It is possible to dispose an ejection tube 27 for ejecting air, which blows air onto the fabric N and pushes the fabric N into the gap 25, as the folding portion 26. It is possible to dispose a folding knife unit 28 as the folding portion 26. The folding knife unit 28 is capable of folding the fabric N by pressing and pushing the fabric N into the gap 25. The folding knife unit 28 has a cylinder portion 28a and a knife portion 28b made of a thin metal plate. When the cylinder portion 28a moves downward at a predetermined time, the knife portion 28b is capable of pushing the fabric N into the gap 25.

So to speak, the first fold bridge claw 29 is disposed to be able to bridge the gap 25 between the first conveyor 21 and the first forward and reverse conveyor 23. Therefore, the first fold bridge claw 29 is disposed to be able to advance and retract at predetermined times between an advance position where the gap 25 is bridged for the fabric N not to enter the gap 25 and a retraction position where the gap 25 is not bridged for the fabric N to enter the gap 25. Therefore, even though there is the gap 25, the first fold bridge claw 29 is capable of transporting the fabric N over the gap 25 from the first conveyor 21 to the first forward and reverse conveyor 23.

That is, the first fold bridge claw 29 is capable of being disposed at the advance position to bridge the gap 25 at the predetermined time when the length of the fabric N is measured by the sensor 22a and the well-known second sensor 24a, and transporting the fabric N from the first conveyor 21 to the first forward and reverse conveyor 23. After the predetermined time, while the first fold bridge claw 29 moves from the gap 25 to the retraction position, the rotation of the first forward and reverse conveyor 23 turns into the reverse rotation (rotation in a direction where the fabric N is transported from the rear side R to the front side F), and the folding portion is capable of pushing the fabric N into the gap 25. The first fold bridge claw 29 may not be equipped depending on where the first conveyor 21 and the first forward and reverse conveyor 23 are disposed.

The second conveyor 31 is disposed on the front side F under the first forward and reverse conveyor 23. In the second conveyor 31, a second a roller unit 31a, a second b roller unit 31b, a second c roller unit 31c, and a second d roller unit 31d are disposed which rotate via power of a motor (not illustrated), and a belt unit 32 having flexibility and a belt shape is disposed to sequentially travel around the second a roller unit 31a, the second b roller unit 31b, the second c roller unit 31c, and the second d roller unit 31d (refer to FIG. 2). In the second belt unit 32 of the embodiment made of multiple belt-shaped fabrics, seven pieces of belt-shaped fabrics are disposed in parallel (not illustrated).

The second forward and reverse conveyor 33 is capable of changing a rotational direction from a forward rotation where the fabric N is transported from the rear side R to the front side F to a reverse rotation, at which the fabric N is transported from the front side F to the rear side R, at a predetermined time when a position half or one-third of the length of the fabric N in a direction aligned with the transportation direction is detected and the fabric N is folded. In such way, the well-known second sensor 24a and a well-known third sensor 34a measure a length of the fabric N in the transportation direction, and a position of the fabric N is specified depending on the multiple folding modes (to be described later). The transportation speed of the fabric N in the fabric folding device 10 may be changed to synchronize with a process speed of the roll ironer (not illustrated) that is disposed and dries the fabric N in the previous step of the fabric folding device 10 of the embodiment. It is not possible to obtain an accurate time only by measuring a pass-by time. In this case, it is possible to measure the transportation speed and the predetermined time by measuring pulses in such a way that the well-known second sensor 24a and the well-known third sensor 34a turn on and a pulse measurement starts when the fabric N is transported to the position where the fabric N is detected by one or both of the sensors 24a and 34a, and the sensors 24a and 34a turn off when a side edge of the fabric N escapes from the sensors 24a and 34a.

In the second forward and reverse conveyor 33, a second a forward and reverse roller unit 33a and a second b forward and reverse roller unit 33b are disposed which rotate via power of a motor (not illustrated). A third forward and reverse belt unit 34 having flexibility and a belt shape is wound to travel around the second the forward and reverse roller unit 33a and the second b forward and reverse roller unit 33b. In the third forward and reverse belt unit 34 of the embodiment made of multiple belt-shaped fabrics, seven pieces of belt-shaped fabrics are disposed in parallel (not illustrated).

The second conveyor 31 and the second forward and reverse conveyor 33 are disposed while being spaced apart from each other by a predetermined second gap 35. That is, the second gap 35 is disposed between the second a roller unit 31a and the second a forward and reverse roller unit 33a. Preferably, the second gap 35 is a gap over which the folded fabric N is capable of smoothly passing. The second folding portion 36 is disposed to push the transported fabric N into the second gap 35, and to fold the transported fabric N once more. It is possible to dispose a second ejection tube 37, which blows air onto the fabric N and pushes the fabric N into the second gap 35, as the second folding portion 36. It is possible to dispose a second folding knife unit 38 as the second folding portion 36. The second folding knife unit 38 is capable of folding the fabric N by pressing and pushing the fabric N into the second gap 35. The second folding knife unit 38 has a second cylinder portion 38a and a second knife portion 38b made of a thin metal plate. When the second cylinder portion 38a moves downward at a predetermined time, the second knife portion 38b is capable of pushing the fabric N into the second gap 35.

So to speak, the second fold bridge claw 39 is disposed to be able to bridge over the second gap 35. Therefore, a transportation speed of the fabric N is detected via a time measurement or a pulse measurement (to be described), and thus the second fold bridge claw 39 is disposed to be able to advance and retract between an advance position where the second gap 35 is bridged for the fabric N not to enter the second gap 35 at a predetermined time and a retraction position, at which the second gap 35 is not bridged for the fabric N to enter the second gap 35, at the predetermined time for folding the fabric N at a position half or one-third the length of the fabric N in a direction aligned with the transportation direction. As a result, even though there is the second gap 35, the second fold bridge claw 39 is capable of transporting the fabric N from the second conveyor 31 to the second forward and reverse conveyor 33.

That is, the second fold bridge claw 39 is capable of being disposed at the advance position to bridge the second gap 35 at the predetermined time when the length of the fabric N is measured by the well-known sensor 22a and the well-known third sensor 34a, and transporting the fabric N from the second conveyor 31 to the second forward and reverse conveyor 33. After the predetermined time, while the second fold bridge claw 39 moves from the second gap 35 to the retraction position, the rotation of the second forward and reverse conveyor 33 turns into the reverse rotation (rotation in a direction where the fabric N is transported from the front side F to the rear side R), and the second folding portion 36 is capable of pushing the fabric N into the second gap 35. The second fold bridge claw 39 may not be equipped depending on where the second conveyor 31 and the second forward and reverse conveyor 33 are disposed.

The third conveyor 41 is disposed under the second conveyor 31 in such a way that the third conveyor 41 obliquely ascends from a lower location adjacent to the second forward and reverse conveyor 33. The third conveyor 41 is disposed closer to the rear side R than the second forward and reverse conveyor 33. In the third conveyor 41, a third a roller unit 41a, a third b roller unit 41b, and a third c roller unit 41c are disposed which rotate via power of a motor (not illustrated), and a fourth belt unit 42 having flexibility and a belt shape is disposed to sequentially travel around the third a roller unit 41a, the third b roller unit 41b, and the third c roller unit 41c. In the fourth belt unit 42 of the embodiment made of multiple belt-shaped fabrics, seven pieces of belt-shaped fabrics are disposed in parallel (not illustrated).

A fourth conveyor 51 is disposed closer to the rear side R than the third conveyor 41, and passes the fabric N over, which has been transported from the third conveyor 41, from the front side F to the rear side R. In the fourth conveyor 51, a fourth a roller unit 51a and a fourth b roller unit 51b are disposed which rotate via power of a motor (not illustrated), and a fourth belt unit 52 having flexibility and a belt shape is disposed to travel around the fourth a roller unit 51a and the fourth b roller unit 51b. In the fourth belt unit 52 of the embodiment made of multiple belt-shaped fabrics, seven pieces of belt-shaped fabrics are disposed in parallel (not illustrated). The fourth conveyor 51 is capable of stopping a travel operation when the folded fabric N is detected by a well-known fourth sensor 52a and a predetermined rotation is performed, which will be described later. The transportation speed of the fabric N in the fabric folding device 10 may be changed to synchronize with a process speed of the roll ironer (not illustrated) that is disposed and dries the fabric N in the previous step of the fabric folding device 10 of the embodiment. It is not possible to obtain an accurate time only by measuring a pass-by time. In this case, it is possible to measure the transportation speed and the time for performing the predetermined rotation by measuring pulses in such a way that the well-known fourth sensor 52a turns on and a pulse measurement starts when the fabric N is transported to the position where the fabric N is detected by the fourth sensor 52a, and the fourth sensor 52a turns off when a side edge of the fabric N escapes from the fourth sensor 52a.

The rotation means 61 has an elevating cylinder 63 that moves a rotating disc 62 upward and downward, and the rotating disc 62 rotates the folded fabric N one fourth turn via a motor (not illustrated). That is, the rotating disc 62 rotates the fabric N substantially 90 degrees. The rotation means 61 is disposed above substantially the center of the fourth conveyor 51, and is capable of rotating the fabric N by pressing the rotating disc 62, which is moved downward by the elevating cylinder 63, against the fabric N, and then rotating the rotating disc 62 when the fourth conveyor 51 transports the fabric N and stops at a predetermined time. The longitudinal direction T of the fabric N is aligned with the transportation direction of the fabric N, that is, the direction heading from the front side F to the rear side R, and after the rotating disc 62 rotates the fabric N (refer to FIGS. 5 to 7 for an operation of rotating the fabric N), the transportation direction of the fabric N, that is, the direction heading from the front side F to the rear side R becomes aligned with the width direction H of the fabric N.

As described above, the fourth conveyor 51 is capable of stopping the travel operation at the predetermined time. A well-known fifth sensor 65 is disposed to detect the time for operation stop. The rotating disc 62 of the rotation means 61 is moved downward by the elevating cylinder 63, and rotates the fabric N at the predetermined time for rotation which is detected by the fifth sensor 65.

Figure 3:
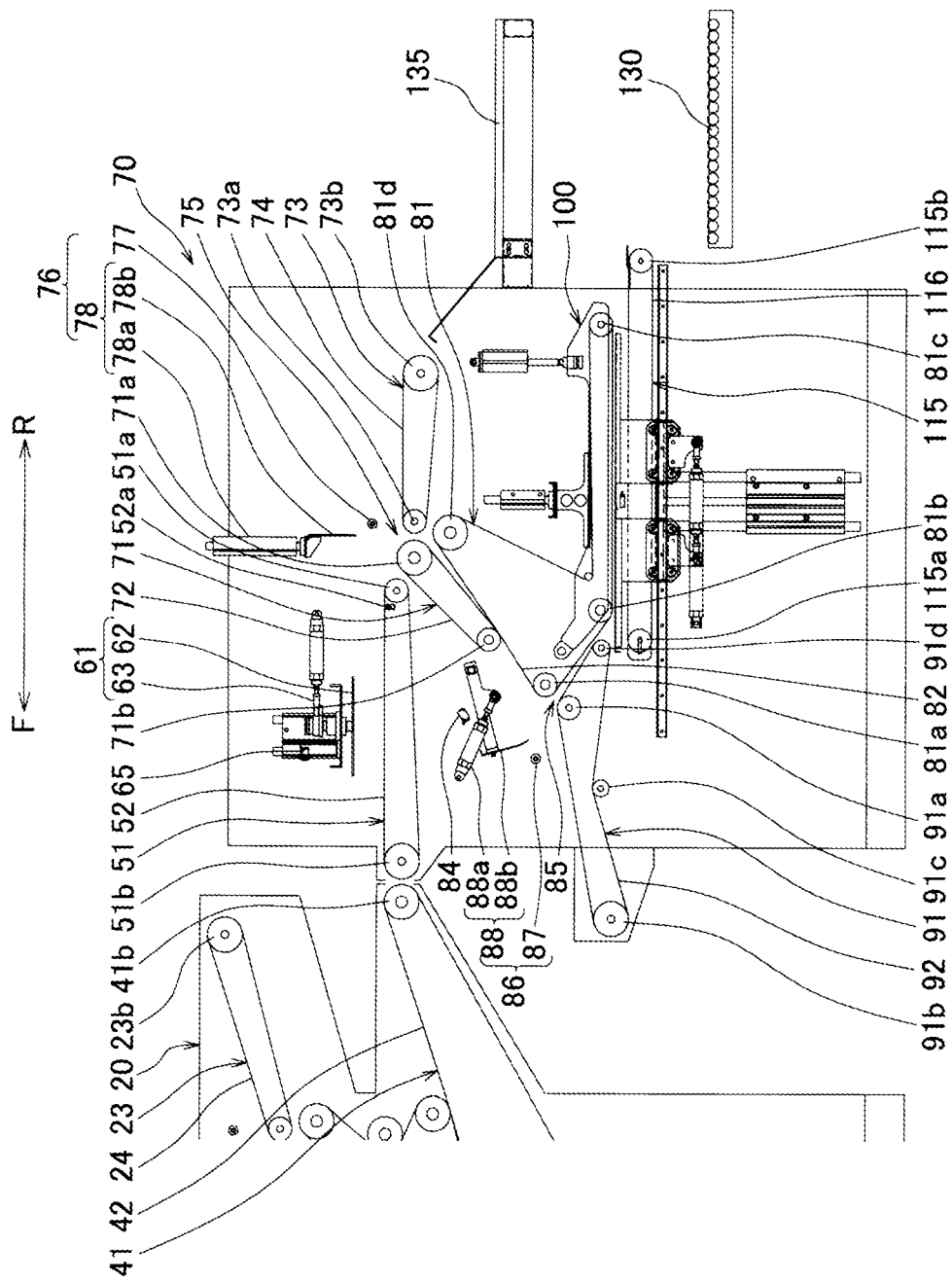
FIG. 3 is a conceptual side view of rotation means and a second folding unit of the fabric folding device.

The second folding unit 70 includes a fifth conveyor 71; a third forward and reverse conveyor 73; a third folding portion 76; a sixth conveyor 81; a fourth folding portion 86; and a fourth forward and reverse conveyor 91 (refer to FIGS. 1 and 3).

The fifth conveyor 71 is disposed under the fourth conveyor 51 in such a way that the fifth conveyor 71 inclines downward from the rear side R to the front side F in the fabric folding device 10. The fifth conveyor 71 is capable of transporting the fabric N from the rear side R to the front side F. A fifth a roller unit 71a and a fifth b roller unit 71b are disposed which rotate via power of a motor (not illustrated), and a fifth belt unit 72 having a belt shape is disposed to travel around the fifth a roller unit 71a and the fifth b roller unit 71b (refer to FIG. 3). The fifth belt unit 72 is flexible, and in the fifth belt unit 72 of the embodiment made of multiple belt-shaped fabrics, seven pieces of belt-shaped fabrics are disposed in parallel, that is, in a direction vertical to the direction heading from the front side F to the rear side R (not illustrated).

A transportation speed of the fabric N from the fourth conveyor 51 is detected, and thus the third forward and reverse conveyor 73 is capable of changing a rotational direction from a forward rotation where the fabric N is transported from the front side F to the rear side R to a reverse rotation, at which the fabric N is transported from the rear side R to the front side F, at a predetermined time for folding the fabric N at a position half or one-third the length of the fabric N in a direction aligned with the transportation direction. In such way, the well-known fourth sensor 52a and the well-known fifth sensor 65 measure a length of the fabric N in the transportation direction, and a folding position of the fabric N is specified depending on the multiple folding modes (to be described later). In the third forward and reverse conveyor 73, third forward and reverse roller units 73a and 73b are disposed which rotate via power of a motor (not illustrated), and a third forward and reverse belt unit 74 having flexibility and a belt shape is disposed to wind around the third forward and reverse roller units 73a and 73b. In the third forward and reverse belt unit 74 of the embodiment made of multiple belt-shaped fabrics, seven pieces of belt-shaped fabrics are disposed in parallel, that is, in a direction vertical to the direction heading from the front side F to the rear side R (not illustrated). The transportation speed of the fabric N in the fabric folding device 10 may be changed to synchronize with a process speed of the roll ironer (not illustrated) that is disposed and dries the fabric N in the previous step of the fabric folding device 10 of the embodiment. It is not possible to obtain an accurate time only by measuring a pass-by time. In this case, it is possible to measure the transportation speed and the predetermined time by measuring pulses in such a way that the well-known fourth sensor 52a and the well-known fifth sensor 65 turn on and a pulse measurement starts when the fabric N is transported to the position where the fabric N is detected by one or both of the sensors 52a and 65, and the sensors 52 and 65 turn off when a side edge of the fabric N escapes from the sensors 52a and 65.

The sixth conveyor 81 is disposed under the third forward and reverse conveyor 73 and the fifth conveyor 71, and closer to the front side F than the third forward and reverse conveyor 73. In the sixth conveyor 81, sixth roller units 81a, 81b, 81c, 81d, and 81e are disposed which rotate via power of a motor (not illustrated), and a sixth belt unit 82 having flexibility and a belt shape is disposed to sequentially travel around the sixth roller units 81a, 81b, and 81e. In the sixth belt unit of the embodiment made of multiple belt-shaped fabrics, seven pieces of belt-shaped fabrics are disposed in parallel, that is, in a direction vertical to the direction heading from the front side F to the rear side R (not illustrated).

The third forward and reverse conveyor 73 and the fifth conveyor 71 are disposed while being spaced apart from each other by a predetermined third gap 75. That is, the third gap is disposed between the fifth a roller unit 71a and the third forward and reverse roller unit 73a. Preferably, the third gap 75 is a gap over which the folded fabric N is capable of smoothly passing. The third folding portion 76 is disposed to push the transported fabric N into the third gap 75, and to fold the transported fabric N. It is possible to dispose a third ejection tube 77, which blows air onto the fabric N and pushes the fabric N into the third gap 75, as the third folding portion 76. It is possible to dispose a third folding knife 78 as the third folding portion 76. The third folding knife unit 78 has a third cylinder portion 78a and a third knife portion 78b made of a thin metal plate. When the third cylinder portion 78a moves downward at a predetermined time, the third knife portion 78b is capable of pushing the fabric N into the third gap 75.

A transportation speed of the fabric N is detected, and thus the fourth forward and reverse conveyor 91 adjacent to the sixth conveyor 81 is capable of changing a rotational direction from a forward rotation where the fabric N is transported from the rear side R to the front side F to a reverse rotation, at which the fabric N is transported from the front side F to the rear side R, at a predetermined time for folding the fabric N at a position half or one-third the length of the fabric N in a direction aligned with the transportation direction. It is possible to measure a length of the fabric N in the transportation direction via a well-known sixth sensor 84, and specify a folding position of the fabric N depending on the multiple folding modes (to be described later). In the fourth forward and reverse conveyor 91, fourth forward and reverse roller units 91a, 91b, 91c, and 91d are disposed which rotate via power of a motor (not illustrated), and a fourth forward and reverse belt unit 92 having flexibility and a belt shape is disposed to wind around the fourth forward and reverse roller units 91a, 91b, 91c, and 91d. In the fourth forward and reverse belt unit 92 of the embodiment made of multiple belt-shaped fabrics, seven pieces of belt-shaped fabrics are disposed in parallel, that is, in a direction vertical to the direction heading from the front side F to the rear side R (not illustrated). The transportation speed of the fabric N in the fabric folding device 10 may be changed to synchronize with a process speed of the roll ironer (not illustrated) that is disposed and dries the fabric N in the previous step of the fabric folding device 10 of the embodiment. It is not possible to obtain an accurate time only by measuring a pass-by time. In this case, it is possible to measure the transportation speed and the predetermined time by measuring pulses in such a way that the well-known sixth sensor 84 turns on and a pulse measurement starts when the fabric N is transported to the position where the fabric N is detected by the sixth sensor 84, and the sixth sensor 84 turns off when a side edge of the fabric N escapes from the sixth sensor 84.

The sixth conveyor 81 and the fourth forward and reverse conveyor 91 are disposed while being spaced apart from each other by a predetermined fourth gap 85. That is, the fourth gap 85 is disposed between the sixth a roller unit 81a and the fourth forward and reverse roller unit 91a. Preferably, the fourth gap 85 is a gap over which the folded fabric N is capable of smoothly passing. The fourth folding portion 86 is disposed to push the transported fabric N into the fourth gap 85, and to fold the transported fabric N. It is possible to dispose a fourth ejection tube 87, which blows air onto the fabric N and pushes the fabric N into the fourth gap 85, as the fourth folding portion 86. It is possible to dispose a fourth folding knife 88 as the fourth folding portion 86. The third folding knife unit 88 has a fourth cylinder portion 88a and a fourth knife portion 88b made of a thin metal plate. When the fourth cylinder portion 88a moves downward at a predetermined time, the fourth knife portion 88b is capable of pushing the fabric N into the fourth gap 85. Preferably, each of the gap 25, the second gap 35, the third gap 75, and the fourth gap 85 is a gap over which the fabric N is capable of smoothly passing. That is, the fabric N may have a thickness in a wide range from a thickness of a thin napkin to a thickness of a thick blanket, and the thickness of the fabric N gradually increases along with the progression of folding. It is possible to appropriately set the gaps for a target.

Figure 4:
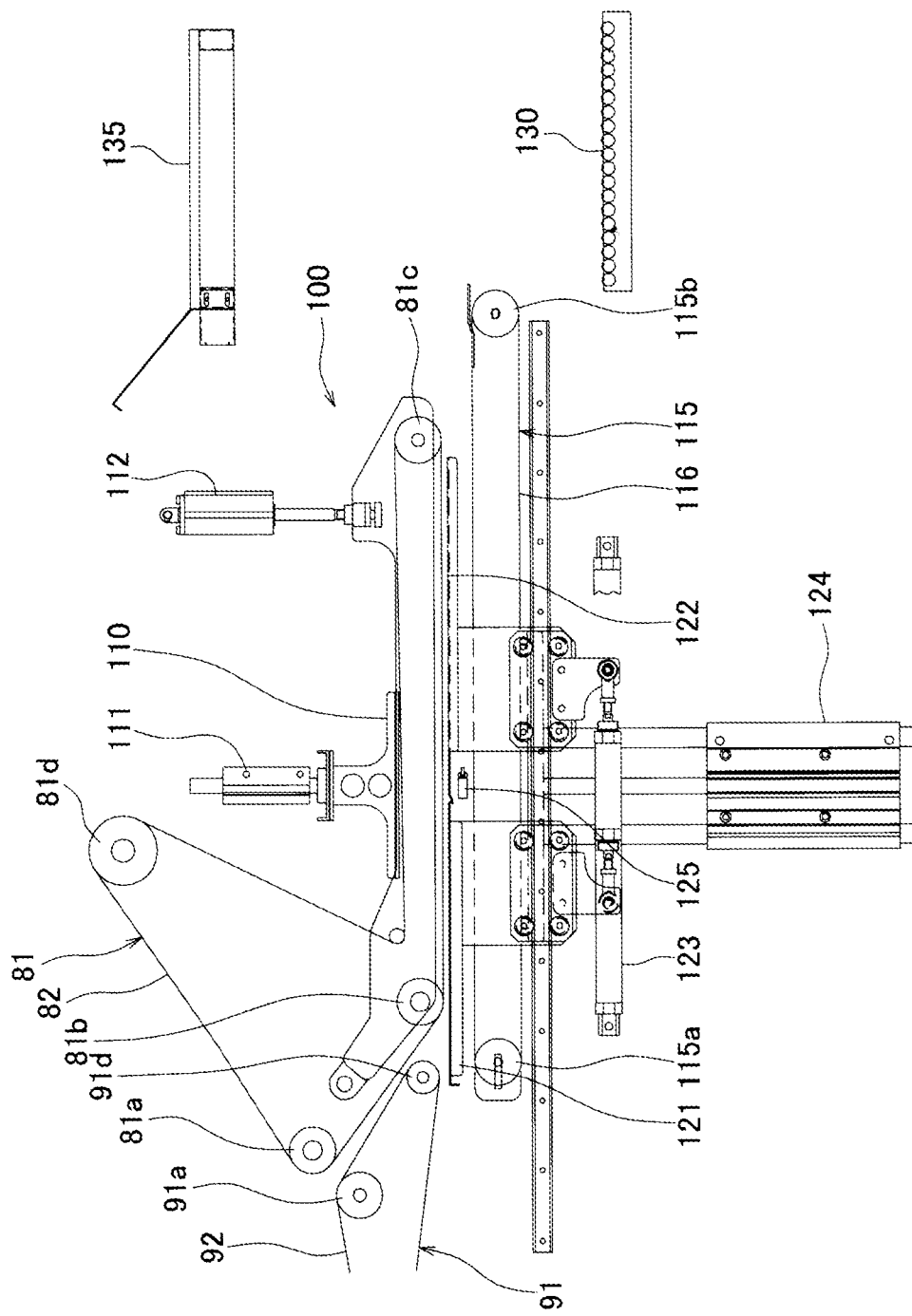
FIG. 4 is a conceptual side view of a stacking unit of the fabric folding device.

The fabric N transported by the sixth conveyor 81 is transported to a stacking unit 100. The stacking unit 100 transports and stacks the folded fabrics N. The stacking unit 100 stacks and transports a predetermined number of the fabrics N out of the device. The stacking unit 100 has a brake unit 110; a brake cylinder 111; a lifting cylinder 112 for moving the sixth conveyor 81 upward and downward; and a seventh conveyor 115 (refer to FIG. 4).

The stacking unit 100 further has a first opening/closing door 121; a second opening/closing door 122; an opening/closing cylinder 123 for opening and closing the first opening/closing door 121 and the second opening/closing door 122; a seventh lift-up cylinder 124 for lifting the seventh conveyor 115 upward; a vertical motion sensor 125 for moving the seventh lift-up cylinder 124 (for lifting the seventh conveyor 115 upward) upward and downward at a predetermined position; a roller conveyor 130; and a table 135. The table 135 discharges the fabric N that is folded in the first folding unit 20 (refer to FIG. 4).

The seventh conveyor 115 is disposed under the sixth conveyor 81 in such a way that the fabric N is transported from the front side F to the rear side R of the fabric folding device 10. The seventh conveyor 115 is capable of transporting the fabric N from the front side F to the rear side R. In the seventh conveyor 115, a seventh a roller unit 115a and a seventh b roller unit 115b are disposed which rotate via power of a motor (not illustrated), and a seventh belt unit 116 having a belt shape is disposed to travel around the seventh a roller unit 115a and the seventh b roller unit 115b. The seventh belt unit 116 is flexible, and in the seventh belt unit 116 of the embodiment made of multiple belt-shaped fabrics, seven pieces of belt-shaped fabrics are disposed in parallel, that is, in a direction vertical to the direction heading from the front side F to the rear side R (not illustrated).

The folded fabric N is pressed downward by the brake unit 110, and the first opening/closing door 120 and the second opening/closing door 121 are disposed thereunder. The first opening/closing door 120 and the second opening/closing door 121 are open when the fabric N is pressed downward, the folded fabric N falls onto the seventh conveyor 115, is transported to the roller conveyor 130 by the seventh conveyor 115, and is stacked on the roller conveyor 130 (refer to FIG. 4).

A method of folding the fabric N will be described hereinbelow. The fabric N has the longitudinal direction T, and the width direction H intersecting the longitudinal direction T.

The first folding unit 20 is capable of folding the fabric N one time at a position t1 half the length of the fabric N in the longitudinal direction T. This step is referred to as a one-time folding step S1. Subsequently, the folded fabric N, the length of which is shortened in the longitudinal direction T, is rotated substantially 90 degrees by the rotation means 61. That is, the rotation is performed such that the longitudinal direction T of the folded and shortened fabric N is aligned laterally, and the original width direction H of the fabric N is aligned with a transportation direction. This step is referred to as a first rotation step S2.

Thereafter, the second folding unit 70 is capable of folding the fabric N, which has been folded in the one-time folding step, one time once more at a position h1 half the length of the fabric N in the original width direction H. This step is referred as a second one-time folding step S3. The second folding unit 70 is capable of folding the fabric N at positions h2 and h3 one-third the length of the fabric N in the original width direction H. More specifically, the second folding unit 70 is capable of folding the fabric N at h2 at a first time and at the position h3 at a second time. This step is referred to as a second French-folding step S4. The first folding unit 20 is capable of folding the fabric N one time at a position h4 half the length of the fabric N in the original width direction H, and folding the half-folded fabric N once more in a state where positions h5 and h6 half the length of the fabric N in the original width direction H overlap each other. This step is referred to as a second quarter-folding step S5 (refer to FIG. 5).

Another method of folding the fabric N will be described hereinbelow.

The first folding unit 20 folds the fabric N at a position t10 one-third the length of the fabric N in the longitudinal direction T at a first time, and folds the fabric N once more at a position t20 two-third the length of the fabric N at a second time. This step is referred to as a so-called French-folding step S10. Subsequently, the folded fabric N, the length of which is shortened in the longitudinal direction T, is rotated substantially 90 degrees by the rotation means 61. That is, the 90-degree rotation is performed such that the longitudinal direction T of the folded and shortened fabric N is aligned laterally, and the original width direction H is aligned with a transportation direction. This step is referred to as a second rotation step S20.

Thereafter, the second folding unit 70 is capable of folding the fabric N, which has been folded in the French-folding step S10, one time once more at a position h10 half the length of the fabric N in the original width direction H. This step is referred as a second one-time folding step S30. The second folding unit 70 is capable of folding the fabric N at a position h20 one-third the length of the fabric N in the original width direction H. More specifically, the second folding unit 70 is capable of folding the fabric N at the one-third at a first time, and folding the fabric N once more at a position h30 two-third the length at a second time. This step is referred to as a second French-folding step S40. The first folding unit 20 is capable of folding the fabric N one time at a position h40 half the length of the fabric N in the original width direction H, and folding the half-folded fabric N once more in a state where positions h50 and h60 half the length of the fabric N in the original width direction H overlap each other. This step is referred to as a second quarter-folding step S50 (refer to FIG. 6).

Still another method of folding the fabric N will be described hereinbelow.

The first folding unit 20 folds the fabric N one time at a position t100 half the length of the fabric N in the longitudinal direction T, and folds the half-folded fabric N once more at positions t200 and t300 half the length of the fabric N in the longitudinal direction T. This step is referred to as a quarter-folding step S100. Subsequently, the fabric N, which has been folded in the quarter-folding step S100, and the length of which is shortened in the longitudinal direction T, is rotated substantially 90 degrees by the rotation means 61. That is, the rotation is performed such that the longitudinal direction T of the folded and shortened fabric N is aligned laterally, and the original width direction H is aligned with a transportation direction. This step is referred to as a third rotation step S200.

Thereafter, the second folding unit 70 is capable of folding the fabric N, which has been folded in the quarter-folding step, one time once more at a position h100 half the length of the fabric N in the original width direction H. This step is referred as a second one-time folding step S300. The second folding unit 70 folds the fabric N at a position h200 one-third the length of the fabric N in the original width direction H, and folds the fabric N at a position h300 two-third the length at a second time. This step is referred to as a so-called second French-folding step S400. The first folding unit 20 is capable of folding the fabric N one time at a position h400 half the length of the fabric N in the original width direction H, and folding the half-folded fabric N once more in a state where positions h500 and h600 half the length of the fabric N in the original width direction H overlap each other. This step is referred to as a second quarter-folding step S500 (refer to FIG. 7).

Because three types of folding methods are used by the first folding unit 20, and similarly, three types of folding methods are used by the second folding unit 70, nine types of folding methods can be used. If folding methods of only the first folding unit 20, that is, the one-time folding step S1, the French-folding step S10, and the quarter-folding step S100 are taken into account, 12 types of folding methods can be used (refer to FIGS. 5 to 7). Therefore, the fabric folding device 10 of the embodiment has 12 different types of modes of folding the fabric N.

Subsequently, an operation in which the fabric folding device 10 of the embodiment folds the fabric N 10 will be described. In FIGS. 8 to 16, A illustrates operations that are performed on the fabric N by the fabric folding device 10, and B illustrates operational effects of the fabric folding device 10 on the fabric N, and illustrates plan views of the fabric N as seen above. A right side and a left side of the sheet of each drawing represent the front side F and the rear side R, respectively.

In the one-time folding step S1, the first folding unit 20 transports the fabric N, which is disposed on the first conveyor 21, from the front side F to the rear side R to fold the fabric N at the position t1 half the length of the fabric N in the longitudinal direction T (refer to A and B of (1) of FIG. 8). Subsequently, because a double-folding mode (mode of double-folding the fabric N) is already selected (not illustrated), the first fold bridge claw 29 is disposed at the retraction position. Accordingly, the fabric N passes over the gap 25. The second fold bridge claw 39 is disposed at the advance position at that time (refer to FIG. 5, and A and B of (2) of FIG. 8).

The fabric N, which have passed over the gap 25, is disposed on the second conveyor 31. The sensor 22a and the second sensor 24a measure a length of the fabric N in the longitudinal direction T and a transportation speed of the fabric N, and thus the second fold bridge claw 39, which is disposed at the advance position and bridge the second gap 35, moves to the retraction position when the position t1 half the length of the fabric N being transported in the longitudinal direction T is placed on the second gap 35. In addition, the second forward and reverse conveyor 33 rotates reversely (rotates in a direction where the fabric N is transported from the front side F to the rear side R) when the fabric N is placed on the second forward and reverse conveyor 33 to be half-folded in the longitudinal direction T (refer to A and B of (3) of FIG. 8). Simultaneously, compressed air is ejected from the second ejection tube 37 of the second folding portion 36, the second folding knife unit 38 pushes the fabric N into the second gap 35 such that the position t1 half the length is placed in the second gap 35, and the fabric N is double-folded (refer to FIG. 5, and A and B of (4) of FIG. 8).

Figure 5:
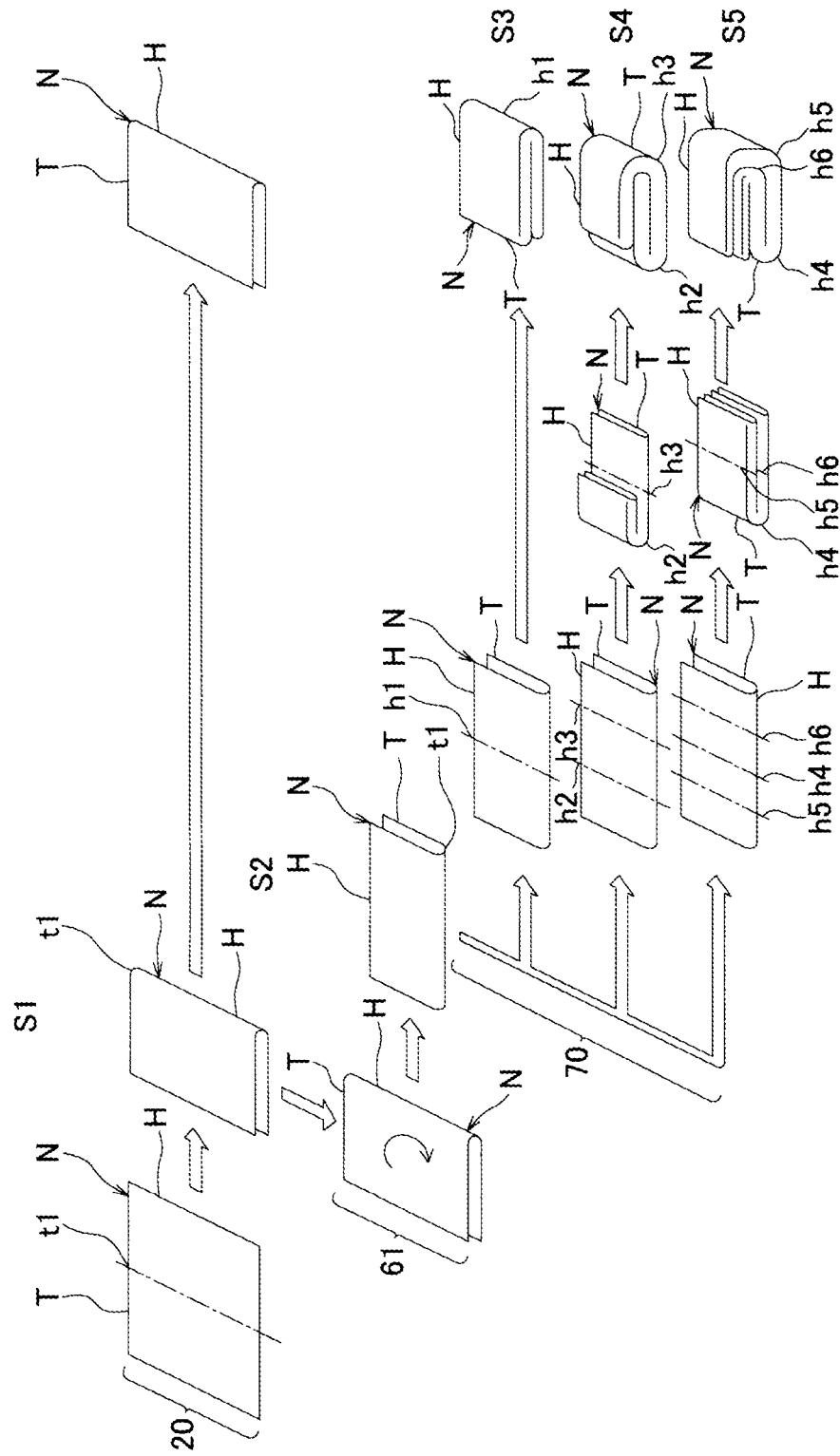
FIG. 5 is a conceptual view illustrating a step of double-folding a fabric.

Thereafter, the double-folded fabric N is transported by the third conveyor 41, and is interposed between the third conveyor 41 and the second conveyor 31 in a state where the fabric N remains double-folded, and thus a folding operation can be reliably performed (refer to FIG. 5, and A and B of (5) of FIG. 9). Thereafter, the fabric N handed over to the fourth conveyor 51 is positioned directly under the rotating disc 62 of the rotation means 61, the fourth conveyor 51 stops rotating, and the rotating disc 62 of the rotation means 61 is moved downward by the elevating cylinder 63 (refer to FIG. 5, and A and B of (6) of FIG. 9). Only if the fabric N is double-folded, the fabric N is transported onto the roller conveyor 130 via the fifth conveyor 71, the third gap 75, the sixth conveyor 81, and the fourth gap 85 without being rotated by the rotation means 61.

The rotating disc 62 moved downward by the elevating cylinder 63 rotates 90 degrees while the fabric N is interposed between the rotating disc 62 and the fourth conveyor 51 (refer to FIG. 5, and A and B of (7) of FIG. 9). The fabric N is rotated 90 degrees relative to a progress direction of the fabric N such that the longitudinal direction T is aligned laterally and the width direction H is aligned with the direction heading from the front side F to the rear side R.

Thereafter, the rotating disc 62 is moved upward by the rotation means 61, and the fourth conveyor 51 at stop restarts operating (refer to A and B of (8) of FIG. 9).

Because the fabric N disposed on the fourth conveyor 51 is transported from the front side F to the rear side R, and the double-folding mode (mode of double-folding the fabric N) is selected, the fabric N passes over the third gap 75. The double-folded fabric N is transported from the rear side R to the front side F while being interposed between the fifth conveyor 71 and the sixth conveyor 81 (refer to A and B of (9) of FIG. 10).

The fabric N, which has been transported onto the sixth conveyor 81, passes over the fourth gap 85, and reaches the fourth forward and reverse conveyor 91 (refer to A and B of (10) of FIG. 10).

The fourth forward and reverse conveyor 91 rotates reversely when the position h1 half the length of the fabric N in the width direction H is placed on the fourth gap 85, that is, in a state where the fabric N to be half-folded in the width direction H is placed on the fourth forward and reverse conveyor 91. Simultaneously, compressed air is ejected from the fourth ejection tube 87 of the fourth folding portion 86, the fourth folding knife unit 88 pushes the fabric N into the fourth gap 85 such that the position h1 half the length in the width direction H is placed in the fourth gap 85, and the fabric N is double-folded once more (refer to A and B of (11) of FIG. 10). The fabric N double-folded once more is interposed between the sixth conveyor 81 and the fourth forward and reverse conveyor 91, and the fabric N remains in a reliable double-folded state (refer to FIG. 5, and A and B of (12) of FIG. 10).

Thereafter, the conveyor 81 transports the transported fabric N to the first opening/closing door 121 and the second opening/closing 122 in a closed state. Because the first opening/closing door 121 and the second opening/closing 122 in a closed state are open by the opening/closing cylinder 123 (refer to A and B of (13) of FIG. 11), and the brake unit 110 presses the fabric N downward, the fabric N falls onto the seventh conveyor 115 (refer to A and B of (14) of FIG. 11). The fabric N fallen onto the seventh conveyor 115 is transported and moved to the roller conveyor 130 by the seventh conveyor 115 (refer to A and B of (15) of FIG. 11).

Subsequently, an operation, in which the fabric folding device 10 of the embodiment French-folds the fabric N and then French-folds the fabric N again, will be described.

In the French-folding step S10, the first folding unit 20 is capable of folding the fabric N two times at the positions t10 and t20 one-third the length in the longitudinal direction T. The fabric N disposed on the first conveyor 21 is transported from the front side F to the rear side R (refer to FIG. 6, and A and B of (16) of FIG. 12). Because the French-folding mode is already selected (not illustrated), the first fold bridge claw 29 is disposed at the advance position. Therefore, part of the fabric N is disposed over the gap 25 on the first forward and reverse conveyor 23 (refer to A and B of (17) of FIG. 12).

The first forward and reverse conveyor 23 rotates reversely (rotates in a direction where the fabric N is transported from the rear side R to the front side F) when the position t10 one-third the length in the longitudinal direction T reaches the gap 25. The first fold bridge claw 29 is disposed at the retraction position, the ejection tube 27 of the folding portion 26 ejects compressed air onto the fabric N, the folding knife unit 28 pushes the fabric N into the gap 25 such that the position t10 one-third the length is placed in the gap 25, and the fabric N is double-folded at the position t10 (refer to FIG. 6, and A and B of (18) of FIG. 12).

The fabric N, which have passed over the gap 25, is disposed on the second conveyor 31. The sensor 22a and the second sensor 24a measure a length of the fabric N in the longitudinal direction T and a transportation speed of the fabric N, and thus the second fold bridge claw 39, which is disposed at the advance position and bridge the second gap 35, moves to the retraction position when the position t20 one-third the length of the fabric N being transported in the longitudinal direction T is placed on the second gap 35. In addition, the second forward and reverse conveyor 33 rotates reversely (rotates in a direction where the fabric N is transported from the front side F to the rear side R) when the position t20 one-third the length of the fabric N in the longitudinal direction T is placed on the second forward and reverse conveyor 33 (refer to FIG. 6, and A and B of (19) of FIG. 12). Simultaneously, compressed air is ejected from the second ejection tube 37 of the second folding portion 36, the second folding knife unit 38 pushes the fabric N into the second gap 35 such that the position t20 is placed in the second gap 35 (refer to FIG. 6, and A and B of (20) of FIG. 13), and the fabric N is double-folded, more specifically, French-folded at the position t20.

Thereafter, the French-folded fabric N is transported by the third conveyor 41, and is interposed between the third conveyor 41 and the second conveyor 31 in a state where the fabric N remains French-folded, and thus a folding operation can be reliably performed (refer to A and B of (21) of FIG. 13). Thereafter, the fabric N handed over to the fourth conveyor 51 is positioned directly under the rotating disc 62 of the rotation means 61, the fourth conveyor 51 stops rotating, and the rotating disc 62 of the rotation means 61 is moved downward by the elevating cylinder 63 (refer to A and B of (22) of FIG. 13).

Figure 6:
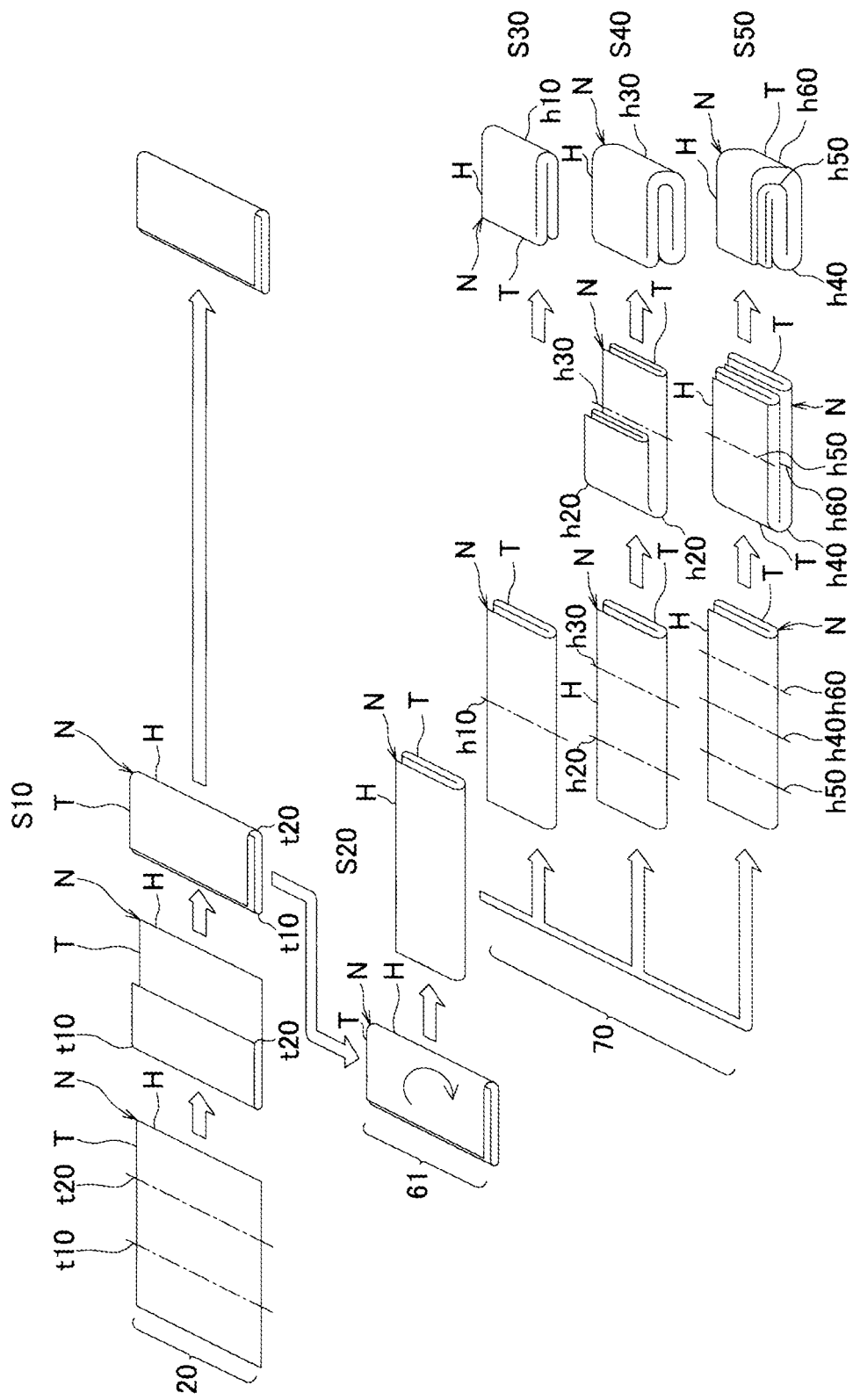
FIG. 6 is a conceptual view illustrating a step of triple-folding a fabric.

The rotating disc 62 is moved downward by the elevating cylinder 63, and the fabric N is interposed between the rotating disc 62 and the fourth conveyor 51 (refer to FIG. 6, and A and B of (23) of FIG. 13). The progress direction of the fabric N interposed between the rotating disc 62 and the fourth conveyor 51 rotates 90 degrees due to rotation of the rotating disc 62. More specifically, the fabric N is rotated 90 degrees such that the longitudinal direction T is aligned laterally and the width direction H is aligned with the progress direction, that is, the direction heading from the front side F to the rear side R.

Thereafter, the rotating disc 62 is moved upward by the rotation means 61, and the fourth conveyor 51 at stop restarts operating (refer to A and B of (24) of FIG. 14).

Because the fabric N disposed on the fourth conveyor 51 is transported from the front side F to the rear side R, and the French-folding mode is selected, the fabric N passes over the third gap 75 (refer to A and B of (25) of FIG. 14).

The third forward and reverse conveyor 73 rotates reversely (rotates in a direction where the fabric N is transported from the rear side R to the front side F) when the position h20 one-third the length of the fabric N in the width direction H is placed on the third gap 75, that is, in a state where 2 one-third the length of the fabric N in the width direction H is placed on the third forward and reverse conveyor 73 (refer to FIG. 6, and A and B of (26) of FIG. 14). Simultaneously, compressed air is ejected from the third ejection tube 77 of the third folding portion 76, the third folding knife unit 78 pushes the fabric N into the third gap 75 such that the position h20 one-third the length in the width direction H is placed in the third gap 75, and the fabric N is double-folded. The fabric N double-folded once more is interposed between the sixth conveyor 81 and the fourth forward and reverse conveyor 91, and the fabric N remains in a reliable double-folded state (refer to FIG. 6, and A and B of (27) of FIG. 14).

The French-folded fabric N is transported from the rear side R to the front side F while being interposed between the fifth conveyor 71 and the sixth conveyor 81 (refer to A and B of (28) of FIG. 15).

The fabric N, which has been transported onto the sixth conveyor 81, passes over the fourth gap 85, and reaches the fourth forward and reverse conveyor 91.

The fourth forward and reverse conveyor 91 rotates reversely (rotates in a direction where the fabric N is transported from the front side F to the rear side R) when the position h30 one-third the length of the fabric N in the width direction H is placed on the fourth gap 85, that is, in a state where 2 one-third the length of the fabric N in the width direction H is placed on the fourth forward and reverse conveyor 91. Simultaneously, compressed air is ejected from the fourth ejection tube 87 of the fourth folding portion 86, the fourth folding knife unit 88 pushes the fabric N into the fourth gap 85 such that the position h30 one-third the length in the width direction H is placed in the fourth gap 85, and the fabric N is double-folded once more (refer to FIG. 6, and A and B of (29) of FIG. 15). The fabric N double-folded once more is interposed between the sixth conveyor 81 and the fourth forward and reverse conveyor 91, and the fabric N remains in a reliable double-folded state (refer to A and B of (30) of FIG. 15).

Thereafter, the conveyor 81 transports the transported fabric N to the first opening/closing door 121 and the second opening/closing 122 in a closed state (refer to A and B of (31) of FIG. 15). Because the first opening/closing door 121 and the second opening/closing 122 in a closed state are open by the opening/closing cylinder 123, and the brake unit 110 presses the fabric N downward, the fabric N falls onto the seventh conveyor 115 (refer to A and B of (32) of FIG. 16). As the fabric N falls onto the seventh conveyor 115, the seventh conveyor 115 transports and moves the fabric N to the roller conveyor 130 while being moved downward by the seventh lift-up cylinder 124 (refer to A and B of (33) of FIG. 16).

Because the fabric N folded by the first folding unit 20 is transported while the fabric N remains folded and is interposed between the conveyors, it is possible to reliably double-fold, French-fold, or quarter-fold the fabric N. It is not necessary to install a pair of right and left French-folding gauges for folding the fabric N which have a long length in a transportation direction and are required for devices in the related art. It is not necessary to install a mechanism for detecting a center of the fabric N, or a mechanism for adjusting a width of the gauge. It is possible to realize a relatively simple structure.

Figure 7:
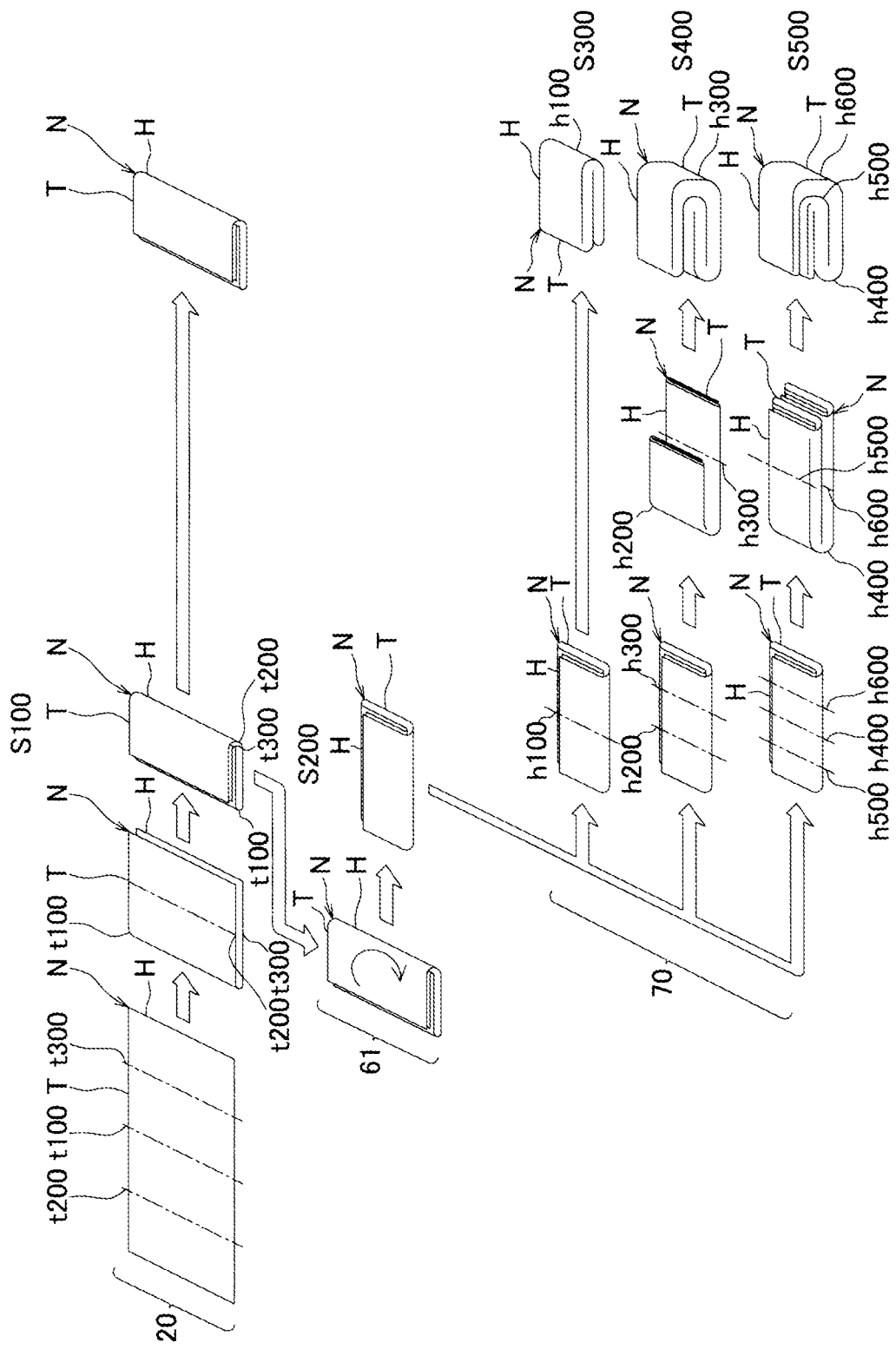
FIG. 7 is a conceptual view illustrating a step of quarter-folding a fabric.

In a further description of the quarter-folding in which the fabric N half-folded in the longitudinal direction T is half-folded once more, the quarter-folding step is substantially equal to the French-folding step, and it is possible to quarter-fold the fabric N by pushing the fabric N into the gap 25 when the position t100 half the length of the fabric N in the longitudinal direction T is placed on the gap 25, and pushing the fabric N into the second gap 35 when the positions t200 and t300 half the length in the longitudinal direction T are placed on the second gap 35 (refer to S100 of FIG. 7).

The steps of double-folding and French-folding the quarter-folded fabric N once more have been described above. When the quarter-folded fabric N is to be quarter-folded, the quarter-folded fabric N is rotated substantially 90 degrees by the rotation means 61. That is, part of the fabric N initially aligned with the width direction H is disposed to align with a transportation direction (refer to S200 of FIG. 7).

The third forward and reverse conveyor 73 rotates reversely (rotates in a direction where the fabric N is transported from the rear side R to the front side F) when the position h400 half the length in the width direction H is placed on the third gap 75, that is, in a state where the position h400 half the length of the fabric N in the width direction H is placed on the third forward and reverse conveyor 73. Simultaneously, compressed air is ejected from the third ejection tube 77 of the third folding portion 76, the third folding knife unit 78 pushes the fabric N into the third gap 75 such that the position h400 half the length of the fabric N in the width direction H is placed in the third gap 75, and the fabric N is double-folded once more. The fabric N double-folded once more is interposed between the sixth conveyor 81 and the fourth forward and reverse conveyor 91, and the fabric N remains in a reliable double-folded state.

The fourth forward and reverse conveyor 91 rotates reversely (rotates in a direction where the fabric N is transported from the front side F to the rear side R) when the fabric N is transported to the fourth gap 85 in a state where the positions h500 and h600 half the length in the width direction H overlap each other. Simultaneously, compressed air is ejected from the fourth ejection tube 87 of the fourth folding portion 86, the fourth folding knife unit 88 pushes the fabric N into the fourth gap 85 such that the positions h500 and h600 half the length in the width direction H are placed in the fourth gap 85, and the fabric N is double-folded once more, eventually, becomes quarter-folded (refer to S500 of FIG. 7). The fabric N double-folded once more is interposed between the sixth conveyor 81 and the fourth forward and reverse conveyor 91, and the fabric N remains in a reliable quarter-folded state.

The fabric folding device 10 of the embodiment has the conveyor devices 15, 15a, 15b, 15c, and 15d, and each of the conveyor devices 15, . . . is capable of individually folding the fabric N. If the first conveyors 21 and the first forward and reverse conveyors 23 of the first folding units 20 operate synchronously, the first folding units 20 are capable of one-time folding, French-folding, and quarter-folding a wide fabric spanning the multiple conveyor devices 15, 15a, . . . .

What is claimed is:

1. A fabric folding device comprising:
a first folding unit capable of folding a fabric, which has a longitudinal direction aligned with a transportation direction and a width direction intersecting the longitudinal direction, at a position half or one-third a length of the fabric in the longitudinal direction; and
rotation means, comprising an elevating cylinder that moves a rotating disc upward and downward, for being capable of rotating the fabric such that the transportation direction is changed from the longitudinal direction to the width direction, by which the fabric folded by the first folding unit is to be transported from a front side to a rear side, and to be folded once more, wherein the rotation means rotates the fabric by pressing the rotating disc against the fabric via the elevating cylinder and rotating the rotating disc.

2. The fabric folding device according to claim 1, further comprising:
a second folding unit capable of folding the fabric, which is rotated by the rotation means, once more at a position half or one-third a length of the fabric in the width direction.

3. The fabric folding device according to claim 1,
wherein the first folding unit has
a first conveyor that transports the fabric from the front side to the rear side,
a first forward and reverse conveyor that further transports the fabric, which is transported from the first conveyor, from the front side to the rear side, and rotates reversely at a predetermined time,
a first folding portion disposed to fold the transported fabric between the first conveyor and the first forward and reverse conveyor,
a second conveyor that transports the fabric, which is transported by the first forward and reverse conveyor, from the rear side to the front side,
a second forward and reverse conveyor that transports the fabric, which is transported from the second conveyor, from the rear side to the front side, and rotates reversely at a predetermined time, and
a second folding portion disposed to fold the transported fabric between the second conveyor and the second forward and reverse conveyor once more.

4. The fabric folding device according to claim 2,
wherein the second folding unit has
a third conveyor that transports the fabric, which is rotated by the rotation means, from the front side to the rear side,
a third forward and reverse conveyor that further transports the fabric, which is transported from the third conveyor, from the front side to the rear side, and rotates reversely at a predetermined time,
a third folding portion disposed to fold the transported fabric between the third conveyor and the third forward and reverse conveyor,
a fourth conveyor that transports the fabric, which is transported by the third forward and reverse conveyor, from the rear side to the front side,
a fourth forward and reverse conveyor that transports the fabric, which is transported from the fourth conveyor, from the rear side to the front side, and rotates reversely at a predetermined time, and
a fourth folding portion disposed to fold the transported fabric between the fourth conveyor and the fourth forward and reverse conveyor once more.

5. The fabric folding device according to claim 3,
wherein a first folding bridge claw is further disposed to bridge a gap between the first conveyor and the first forward and reverse conveyor.

6. The fabric folding device according to claim 3,
wherein a second folding bridge claw is further disposed to bridge a gap between the second conveyor and the second forward and reverse conveyor.

* * * * *